(12) United States Patent
Izume et al.

(10) Patent No.: US 6,859,552 B2
(45) Date of Patent: Feb. 22, 2005

(54) IMAGE RETRIEVING APPARATUS

(75) Inventors: Rieko Izume, Sakai (JP); Yoshihiro Hara, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 589 days.

(21) Appl. No.: 09/992,164

(22) Filed: Nov. 6, 2001

(65) Prior Publication Data

US 2002/0081026 A1 Jun. 27, 2002

(30) Foreign Application Priority Data

Nov. 7, 2000 (JP) ........................................ 2000-339306
Nov. 28, 2000 (JP) ........................................ 2000-361566

(51) Int. Cl.⁷ ................................................ G06K 9/00
(52) U.S. Cl. ...................................... 382/170; 382/305
(58) Field of Search ................................. 382/169, 170, 382/195, 203, 209, 218, 305; 707/6, 104.1

(56) References Cited

U.S. PATENT DOCUMENTS 6,411,953 B1 * 6/2002 Ganapathy et al. ............. 707/6
6,711,287 B1 * 3/2004 Iwasaki ...................... 382/170

FOREIGN PATENT DOCUMENTS

| JP | 63-042406 A | 2/1988 |
|----|-------------|--------|
| JP | 01-134573 A | 5/1989 |
| JP | 01-289696 A | 11/1989 |
| JP | 05-288520 A | 11/1993 |
| JP | 06-168331 A | 6/1994 |
| JP | 06-245064 A | 9/1994 |
| JP | 07-073409 A | 3/1995 |
| JP | 07-152912 A | 6/1995 |
| JP | 10-164370 A | 6/1998 |
| JP | 2000-069304 A | 3/2000 |

OTHER PUBLICATIONS

Hiroshi Murase et al., "Fast Visual Search Using Focused Color Matching –Active Search", Magazine of Institute of Electronic Information Communication (Sep. 25, 1998), vol. J81–D–II, No. 9, pp. 2035 through 2042.

Hiroshi Murase and V.V. Vinod, "Fast Visual Search Using Focussed Color Matching –Active Search–", collection of congress of electronic information and communication D–II vol. J81–DII, No. 9, pp. 2035–2042, Sep. 1998 (including partial translation).

* cited by examiner

Primary Examiner—Phuoc Tran
(74) Attorney, Agent, or Firm—Sidley Austin Brown & Wood LLP

(57) ABSTRACT

In an image retrieving apparatus for retrieving a retrieving image in an input image, a color histogram of an image in a retrieving area in the input image is compared with a color histogram of the retrieving image. At first, a candidate area in which the retrieving image can be included is roughly retrieved by rough image retrieving with selecting a larger retrieving area and a rough resolution of gradation of the histograms. Subsequently, an area including an image corresponding to the retrieving image is precisely retrieved by fine image retrieving with a smaller retrieving area and a fine resolution of gradation of the histograms.

44 Claims, 29 Drawing Sheets

FIG.18A

| 0 | -1 | 0 |
|---|----|---|
| -1 | 5 | -1 |
| 0 | -1 | 0 |

FIG.18B

| 0 | -0.3 | 0 |
|---|------|---|
| -0.3 | 2.2 | -0.3 |
| 0 | -0.3 | 0 |

FIG.18C

| 0 | -0.2 | 0 |
|---|------|---|
| -0.2 | 1.8 | -0.2 |
| 0 | -0.2 | 0 |

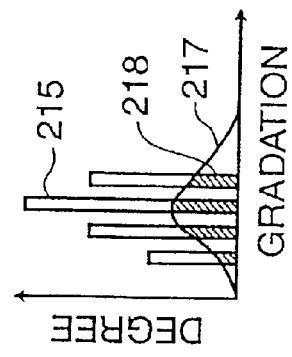
FIG.31C (PRIOR ART)
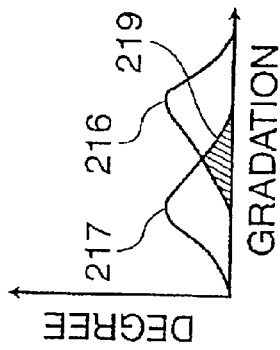
FIG.31F
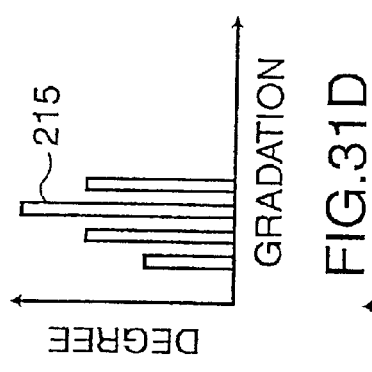
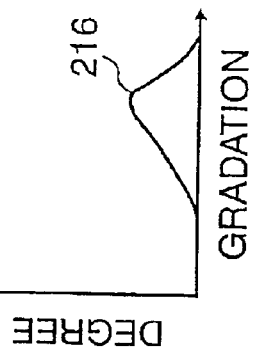
FIG.31D
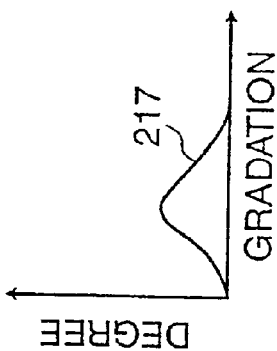
FIG.31G
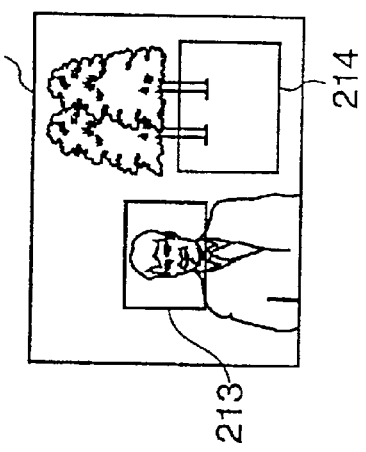
FIG.31E

IMAGE RETRIEVING APPARATUS

This application is based on patent applications 2000-339306 and 2000-361566 filed in Japan, the contents of which are hereby incorporated by references.

BACKGROUND OF THE INVENTION

1. Field of the Invention

The present invention relates to an image retrieving technique for judging whether an image in an area of an input image is similar to or the same as a predetermined reference image or not.

2. Description of the Related Art

Color histogram is conventionally used for judging whether an image in an area of an input image is similar to or the same as a predetermined reference image or not. In the method using the color histogram, a color histogram of the reference image and a color histogram of an image in a predetermined area in the input image are compared. The area in the input image to be compared is moved at a predetermined pitch in the horizontal and vertical directions on the whole input image. The identity or the similarity of the color histogram of each portion of the input image and the color histogram of the reference image are calculated. The area in the input image having the identity or the largest similarity is judged as the area the same as or similar to the reference image. The size of the area in the input image to be compared can be varied corresponding to the size of the reference image.

For increasing the processing speed of the image retrieving by the method using the color histogram, it is proposed to vary the pitch of the movement of the area to be compared corresponding to the similarity of the color histograms (see collection of congress of electronic information and communication D-II Vol.J81-D-II No.9 pp.2035–2042 September 1998). In this modification, when the area to be compared is in the vicinity of the area having the lower similarity, the pitch of the movement of the area is varied to be larger. When the area to be compared is in the vicinity of the area having the higher similarity, the pitch of the movement of the area is varied to be smaller. As a result, the processing speed of the image reference can be made faster.

In the above-mentioned conventional methods, the color histogram is calculated with respect to each image in the area and compared with that of the reference image. Furthermore, the size of the area to be compared can be varied corresponding to the size of the reference image, so that the burden of the image processing becomes larger. Thus, a high performance computer is necessary for processing the image reference. Furthermore, when the color histogram having a fine resolution of gradation is used, the quantity of the calculation necessary for referencing the color histograms becomes much larger.

Actually, it is desired to know whether a predetermined kind of image such as a person is included in the input image or not, instead of judging whether the same image as the reference image is included in the input image or not. In such the case, the size of the area to be compared is generally known. Thus, it is desired to propose a new method for judging whether a predetermined kind of image is included in the input image or not by a calculation performance such as a one-chip microcomputer used in a household electric appliance.

On the other hand, in the image retrieving of the input image by using the color histogram, the number of image data of the input image or the reference image is sometimes small, when the density of the image is small or when the size of the image to be compared is small. In such the case, the color histogram will take a comb shape or a discrete histogram including the gradation of zero degree.

An example that both of the numbers of the image data of the input image and the reference image are small is described with reference to FIGS. 30A to 30E. FIG. 30A shows an input image 201. FIG. 30B shows a reference image 202. Numeral 203 in FIG. 30A designates an area to be retrieved. FIG. 30C shows a normalized color histogram of the area 203. FIG. 30D shows a normalized color histogram of the reference image 202. Hereupon, in the normalized color histogram, a value that the number of the pixels having the same gradation divided by the number of the total pixels is used as the degree of each gradation, and the sum the degrees of every gradations is normalized to be "1".

When the numbers of the image data of the input image 201 and the reference image 202 are small, the color histograms of them will be the discrete comb shape including the gradation of zero degree, as shown in FIGS. 30C and 30D. Furthermore, when the luminance in the input image 201 and/or the reference image 202 are/is varied or when the blushing occurs in one or both of the images, the color histogram of the input image 201 will be discrepant from that of the reference image 202, as shown in FIG. 30E, so that the similarity between the input image 201 and the reference image 202 becomes much lower. Thus, an area to be retrieved will erroneously be judged as the area not including the reference image. The similarity is a value calculated that the number of degrees in the color histograms of the input image 201 and the reference image 202 are compared with respect to each gradation, and the smaller degrees are added with respect to every gradations.

Another example that the number of the image data of the input image 211 is largely different from that of the reference image 212 is described with reference to FIGS. 31A to 31G. FIG. 31A shows an input image 211. FIG. 31B shows a reference image 212. Numeral 213 in FIG. 31A designates an area to be retrieved, and numeral 214 designates another area not to be retrieved. FIG. 31C shows a normalized color histogram 215 of the area 213. FIG. 31D shows a normalized color histogram 216 of the area 214. FIG. 31E shows a normalized color histogram 217 of the reference image 212.

In this example, the number of the image data of the area 213 is smaller than that of the area 214, but the number of the image data of the reference image 212 is similar to that of the area 214.

As can be seen from FIG. 31C, the color histogram 215 which is formed by basing the small number of the image data has a discrete comb shape including the gradation of zero degree. On the other hand, as can be seen from FIGS. 31D and 30E, the color histograms 216 and 217 which are formed by basing the relatively large number of the image data respectively have successive curves taking positive values.

FIG. 31F shows the color histograms 215 and 217 which are superimposed on the same coordinates. In FIG. 31F, hatched portions 218 correspond to the similarity of the color histogram 215 of the area 213 and the color histogram 217 of the reference image 212. FIG. 31G shows the color histograms 216 and 217 which are superimposed on the same coordinates. In FIG. 31G, a hatched portion 219 corresponds to the similarity of the color histogram 216 of the area 214 and the color histogram 217 of the reference image 212.

As can be seen from FIGS. 31F and 31G, the color histogram 215 of the area 213 has the comb shape, so that the similarity of the hatched portions 218 is smaller than that of the hatched portion 219 with respect to the color histogram 217. Thus, the area 214 which is not to be retrieved will erroneously be retrieved as the area including the reference image instead of the area 213 to be retrieved.

As mentioned above, when the color histogram becomes the comb shape, the similarity of the histogram of an area of the input image with respect to that of the reference image becomes lower even though the gradation is discrepant a little. Especially, when the luminance in the input image is varied, the image retrieving performance will become much lower. Furthermore, when the number of the image data of the input image or the reference image is largely different from the number of the image data of the area to be compared, the image retrieving performance will be reduced.

SUMMERY OF THE INVENTION

An object of the present invention is to provide an image retrieving apparatus and a method executed therein, by which an area similar to a reference image can quickly be retrieved in an input image without omission.

Another object of the present invention is to provide an image retrieving apparatus and a method executed therein, by which an area similar to a reference image can precisely be retrieved in an input image when a number of image data is small.

An image retrieving apparatus in accordance with the present invention retrieves whether an image similar to a predetermined retrieving image to be retrieved is included in an input image or not by comprising the following elements.

A first area extracting unit extracts a first retrieving area having a first size from the input image with respect to each movement at a first moving pitch. A first histogram forming unit forms a first histogram with respect to each first retrieving area with a first resolution of gradation. A second histogram forming unit forms a second histogram of the retrieving image with the first resolution of gradation. A second area extracting unit compares the first histogram with the second histogram for calculating a similarity of the first histogram with respect to the second histogram, and extracts a retrieving area having the similarity larger than a first level. A third area extracting unit extracts a second retrieving area having a second size from the first retrieving area extracted by the second area extracting unit at a second moving pitch. A third histogram forming unit forms a third histogram with respect to each second retrieving area with a second resolution of gradation which is higher than the first resolution of gradation. A fourth histogram forming unit forms a fourth histogram of the retrieving image with the second resolution of gradation. An area retrieving unit compares the third histogram with the fourth histogram for calculating a similarity of the third histogram with respect to the fourth histogram, and retrieves an area having the similarity larger than a second level.

By such a configuration, the image retrieving of the retrieving image in the input image is executed at two stages with different sizes of retrieving areas and different resolutions of gradation of the color histograms. At first, at least one candidate area in which the retrieving image can be included is extracted in the input image by a rough image retrieving with a larger size of the retrieving areas and a rough (lower) resolution of gradation of the color histograms. Subsequently, an area in which the retrieving image is included is extracted in the candidate area by a fine image retrieving with a smaller size of the retrieving areas and a fine (higher) resolution of gradation of the color histograms. Thus, it is possible to lighten the burden for calculating the histograms and to shorten the time for the image retrieving process.

Another image retrieving apparatus in accordance with the present invention retrieves whether an image similar to a predetermined retrieving image to be retrieved is included in an input image or not by comprising the following elements.

An area extracting unit extracts a retrieving area having a predetermined size from the input image with respect to each movement at a predetermined moving pitch. A judging unit judges whether a number of pixels included in the retrieving area is smaller than a predetermined value or not. A first histogram forming unit forms a first histogram with respect to each retrieving area with a first resolution of gradation, and smoothes the first histogram when the number of pixels in the retrieving area is smaller than the predetermined value. A second histogram forming unit forms a smoothed second histogram of the retrieving image. An area retrieving unit calculates a similarity of the first histogram of each retrieving area with respect to the second histogram by comparing the first histogram with the second histogram, and retrieves an area having the similarity larger than a predetermined level.

By such a configuration, the histograms are smoothed with having no comb shape, so that the similarity of the histogram of the retrieving area in the input image with respect to that of the retrieving image cannot be lower due to the discrepant between the gradations. Thus, it is possible to retrieve the area in the input image similar to the retrieving image precisely.

BRIEF DESCRIPTION OF THE DRAWINGS

FIGS. 18A to 18C are drawings respectively for showing examples of filters used in edge emphasizing process in a digital still camera using the image retrieving apparatus in accordance with the first embodiment;

FIG. 31A is the drawing for showing the relation between the input image and the retrieving image in the conventional image retrieving method;

FIG. 31B is a drawing for showing the reference image used in the conventional image retrieving method; and FIGS. 31C to 31G are graphs of the color histograms for showing the conventional image retrieving method.

DETAILED DESCRIPTION OF THE EMBODIMENT

First Embodiment

A first embodiment of the present invention is described with reference to the drawings.

Figure 1:
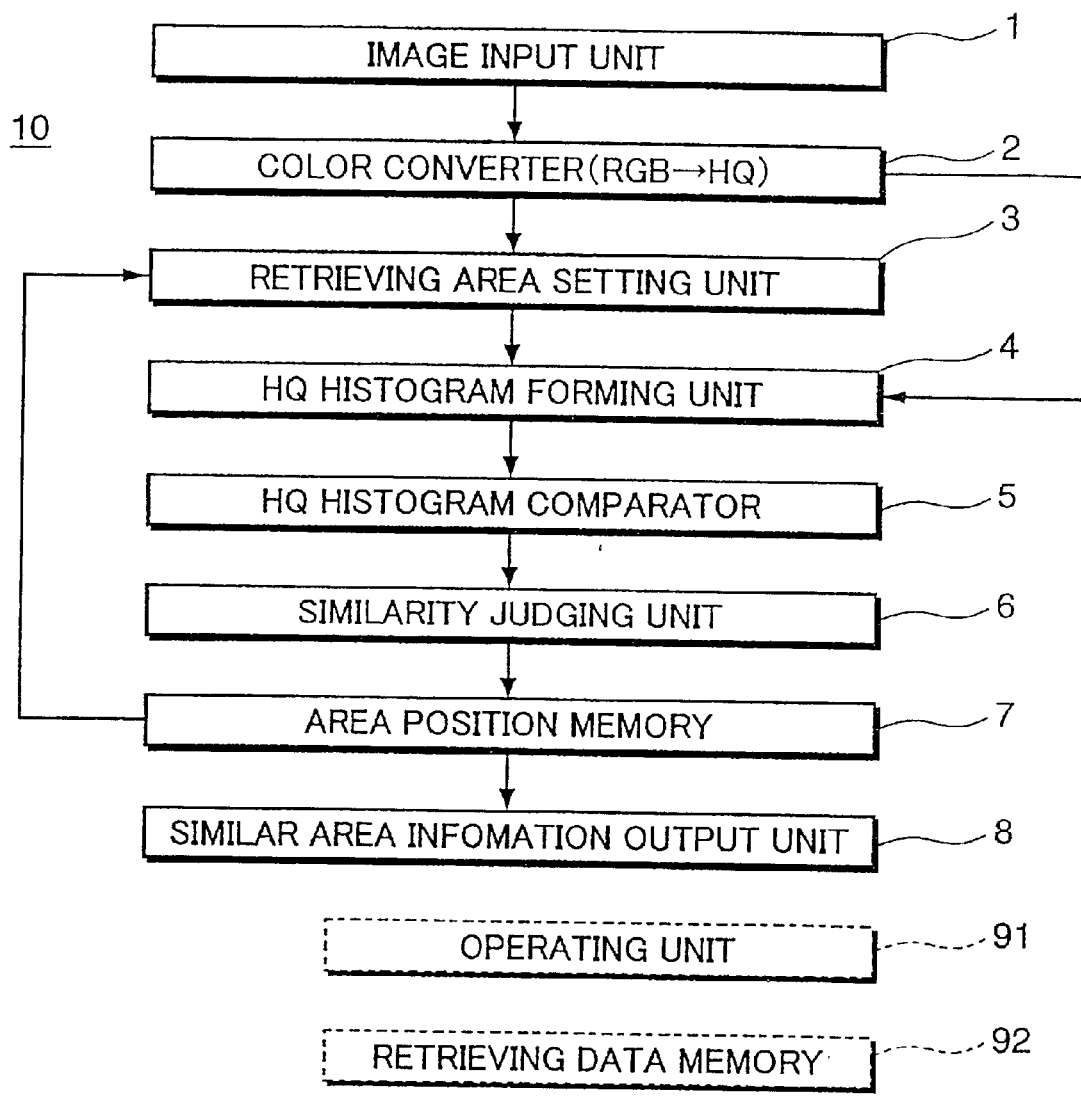
FIG. 1 is a block diagram of an image retrieving apparatus in accordance with a first embodiment of the present invention.

FIG. 1 shows a block diagram of an image retrieving apparatus in accordance with the first embodiment. The image retrieving apparatus 10 comprises an image input unit 1, a color converter 2, a retrieving area setting unit 3, an HQ histogram forming unit 4, an HQ histogram comparator 5, a similarity judging unit 6, an area position memory 7, and a similar area information output unit 8.

The image retrieving apparatus 10 retrieves whether an input image 11 (see FIG. 2) includes a retrieving image similar to a reference image of an object to be retrieved or not by comparing the similarity of color histograms of the image in an area of the input image and the retrieving image. In this description, a part of the input image similar to the reference image is abbreviated as "retrieving image".

Figure 2:
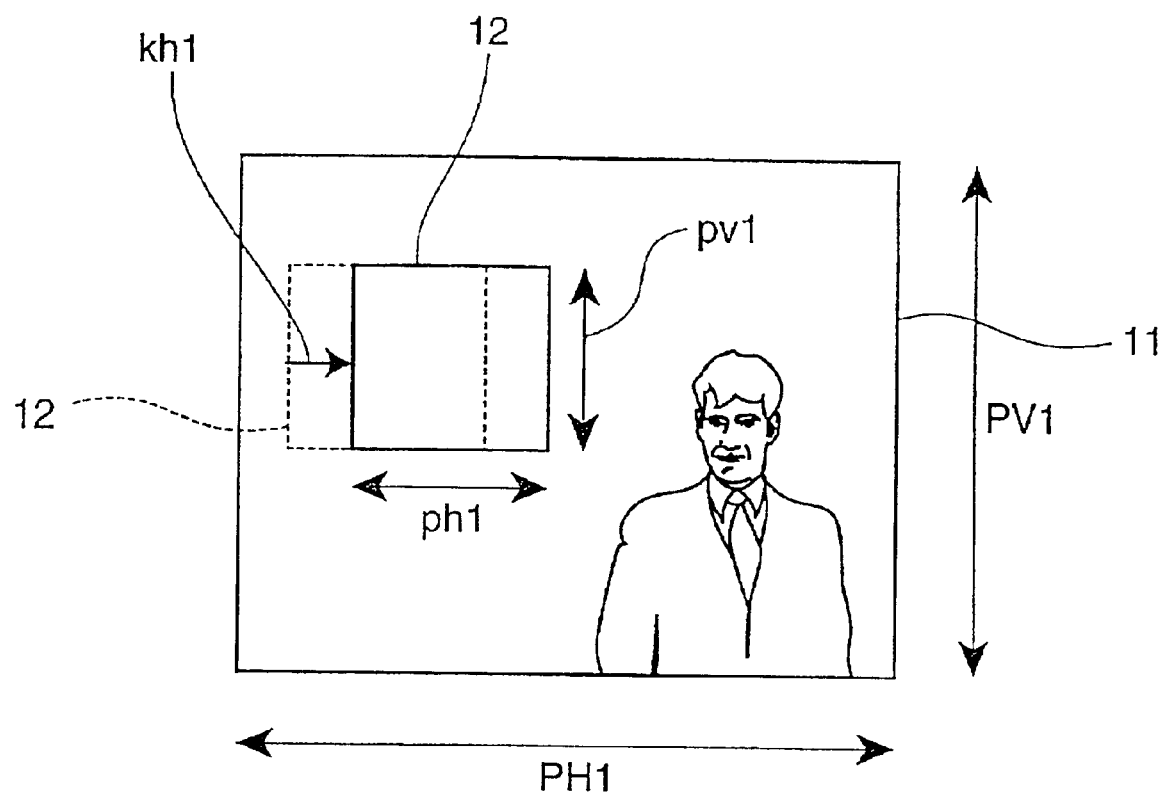
FIG. 2 is a drawing showing an input image and a retrieving area moving in the input image.

At first, an area in which the retrieving image can be existed is roughly retrieved. Subsequently, the position of the retrieving image is precisely retrieved in the roughly retrieved area. In the rough image retrieving of the retrieving image, color histograms having low resolution of gradation are used. In the fine retrieving of the retrieving image, color histograms having high resolution of gradation are used. In both of the rough image retrieving and the fine image retrieving, a size of an area to be compared is selected and the area is moved in predetermined directions at a predetermined pitch so as to scan whole of the input image or the roughly retrieved area. A color histogram is calculated with respect to the image portion at each stop position of the area. All the color histograms are compared with the color histogram of the reference image. In the first embodiment, a human face portion is used as the retrieving image to be retrieved as shown in FIG. 2.

Figure 6A:
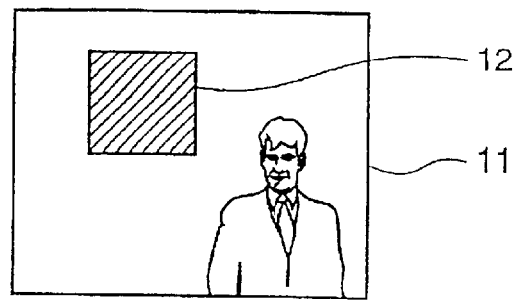
FIG. 6A is a drawing for showing a relation between the input image and the retrieving area moving in the input image in rough image retrieving in the first embodiment.
Figure 6B:
FIG. 6B is a drawing for showing the retrieving image 13 to be retrieved in the rough image retrieving in the first embodiment.

The image input unit 1 takes an input image 11 and a retrieving image 13 (see FIG. 6B). For example, the input image 11 has 640 (horizontal direction)×480 (vertical direction) pixels, and the retrieving image 13 has 60×80 pixels. The input image 11 and the retrieving image 13 are respectively taken as an image data configured by R(red), G(green) and B(blue) color signals.

The color converter 2 converts the image data configured by R(red), G(green) and B(blue) color signals to another image data configured by hue (H) and compensated saturation (Q) by following equations.

$$H = \cos^{-1}[\{(R-G)+(R-B)\}/2 \cdot 1/\sqrt{\{(R-G)^2+(R-B)\cdot(G-B)\}}] \quad (1)$$

$$Q = [\{(2R-G-B)/2\}^2 + \{\sqrt{(3)}(G-B)/2\}^2] \quad (2)$$

Since the hue (H) may not be affected by variation of luminance, it is effective for retrieving an object in which the luminance of the object will be predicted. Since the compensated saturation (Q) has a characteristic that the saturation value increases in proportion to the brightness, it is preferable for detecting human skin having relatively high brightness. It can emphasize the human skin much more than the saturation obtained from the Munsell color system.

The retrieving area setting unit 3 sets the size of the retrieving area 12 which is to be compared with the retrieving image in the rough image retrieving and the fine image retrieving. In the first embodiment, the retrieving area 12 to be compared has a rectangular shape. The function of the retrieving area setting unit 3 in the rough image retrieving is described with reference to FIG. 2.

As shown in FIG. 2, a length of a horizontal side of the rough retrieving area 12 is set to be ph1, and a length of a vertical side thereof is set to be pv1. When lengths of a horizontal and vertical sides of the input image 11 is shown as PH1 and PV1, the lengths ph1 and pv1 respectively shown by the following formulae.

$$ph1 \approx PH1/4 \text{ and}$$

$$pv1 \approx PV1/4$$

By selecting the size of the rough retrieving area 12 is selected to be 1/16 of the size of the input image 11, it is possible to exclude the areas in which the retrieving image is rarely included from candidate areas for the fine image retrieving. When the size of the rough retrieving area 12 is much larger than a preferable size, there is a possibility to exclude the area in which the retrieving image is included. Alternatively, when the size of the rough retrieving area 12 is much smaller than a preferable size, the quantity to be calculated becomes larger. In the first embodiment, the input image 11 has the pixels of 640×480, so that the rough retrieving area 12 has the pixels of 160×120.

The pitch of the movement of the rough retrieving area 12 in the horizontal direction is selected to be kh1 and that in the vertical direction is selected to be kv1. The rough retrieving area 12 is moved by the pitch kh1 in the horizontal direction and by the pitch kv1 in the vertical direction so as to scan whole the input image 11. In FIG. 2, the rough retrieving area 12 illustrated by the solid line is moved by the pitch kh1 in the horizontal direction from the position illustrated by the dotted line.

In the first embodiment, the pitches kh1 and kv1 in the movement of the rough retrieving area 12 is selected as $$kh1 \approx ph1/2 \text{ and}$$

$$kv1 \approx pv1/2.$$

Thus, the pitch kh1 corresponds to 80 pixels and the pitch kv1 corresponds to 60 pixels.

Subsequently, the function of the retrieving area setting unit 3 in the fine image retrieving is described. When a position of the rough retrieving area to be precisely retrieved is decided by referring the position information of the candidate areas memorized in the area position memory 7. The fine image retrieving is executed so that a fine retrieving area is set in the decided rough retrieving area.

In the first embodiment, the fine retrieving area 15 (see FIG. 7A) is set to be a rectangular shape, and the coordinates (shi, svi) (i=1, 2, 3 . . . ) of the pixel at the upper left end of the area is used as the information with respect to the position of the fine retrieving area.

Figure 7A:
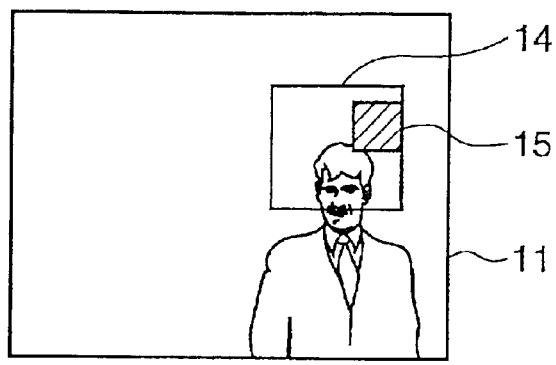
FIG. 7A is a drawing for showing relations between a candidate area to be retrieved and the input image and between the retrieving area and the candidate area moving in the fine image retrieving in the first embodiment.

A size "p" of the fine retrieving area 15 shown in FIG. 7A is set to be that a length of a horizontal side and a length of a vertical side of the fine retrieving area 15 are initially set to be ph2 and pv2. When the fine image retrieving with respect to the rough retrieving area 12 is completed by using the fine retrieving area 15 having a predetermined size "p", the size "p" of the fine retrieving area 15 is reduced by a downsizing ratio "r". The fine image retrieving will be repeated by the same manner until the size "p" of the fine retrieving area 15 becomes equal to or smaller than a predetermined size "P". In the first embodiment, the initial values of the lengths of the horizontal and vertical sides ph2 and pv2 are selected as ph2=ph1 and pv2=pv1.

The downsizing ratio "r" is selected to be r=0.8. By repeating the image retrieving with the reduction of the size of the fine retrieving area 15, it is possible to prevent the missing of the retrieving with no relation to the size of the retrieving image.

The predetermined size "P" is selected to be 1/10 of the size of the input image 11. Thus, the pixels of the predetermined size "P" becomes 64×48 pixels. This size is selected to be the minimum size in view of the case that a human face portion is existed as a part of an object in the input image.

The pitch of the movement of the fine retrieving area 15 in the horizontal direction is selected to be kh2 and that in the vertical direction is selected to be kv2. The fine retrieving area 15 is moved by the pitch kh2 in the horizontal direction and by the pitch kv2 in the vertical direction so as to scan whole the input image 11. Since the values of the pitches have the relations that kv1>kv2 and kh1>kh2, the image retrieving in the fine image retrieving can precisely executed than that in the rough image retrieving. In the first embodiment, the values of the pitches kh2 and kv2 are respectively set to be "1" as the minimum pitch of the movement. By such the selection, it is possible to execute the image retrieving with no missing.

The HQ histogram forming unit 4 shown in FIG. 1 generates the normalized color histograms with using the H and Q data of the input image with respect to each retrieving area set by the retrieving area setting unit 3. Furthermore, the HQ histogram forming unit 4 generates the normalized color histograms with using the H and Q data of retrieving image.

Figure 3:
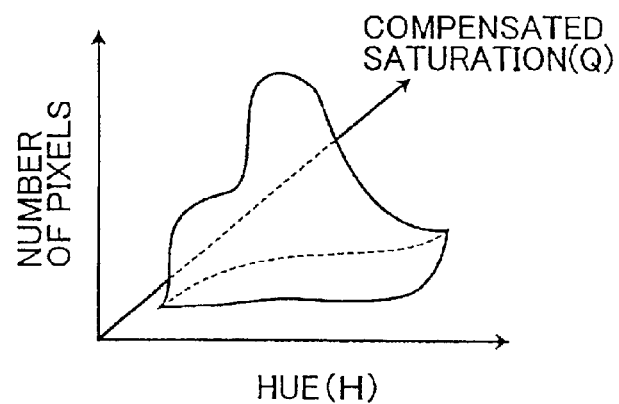
FIG. 3 is a graph for showing an example of a three dimensional color histogram.

The color histogram shows the number of pixels as the degrees, in which the number of pixels in a predetermined area is two-dimensionally counted with respect to each of the hue (H) and the compensated saturation (Q). The color histogram becomes three-dimensional as shown in FIG. 3 which shows an example of the shape of the color histogram. In FIG. 3, the coordinates corresponding to the hue (H) and the compensates saturation (Q) respectively having the largest number of the pixels in the retrieving area take the largest values. The hue (H) takes a value between 0 to $2\pi$ (0° to 360°), and the compensated saturation (Q) takes a value between 0 to the largest value among the values of R, G and B.

The normalized color histogram is the color histogram normalized that the sum of the degrees is to be "1" by dividing the number of pixels with respect to each gradation by the total number of the pixels in the retrieving area.

The HQ histogram forming unit 4 varies the resolution of gradation for forming the color histograms in the rough image retrieving and the fine image retrieving. When the resolution of gradation in the rough image retrieving is shown by a symbol "Na" and the resolution of gradation in the fine image retrieving is shown by a symbol "Nb", the resolution "Na" is selected to be smaller than the resolution "Nb". In the first embodiment, the resolution "Na" is selected to be 16 and the resolution "Nb" is to be 256.

The resolution of gradation is the finesse of the gradation. The resolution of gradation "N" means that the number of the division of the gradation is to be "N". When the resolution of gradation is selected to be "N" and the total number of the gradation is to be 256, a width of the gradation becomes 256/N. The color histogram having a large resolution of gradation "N" is called "fine resolution color histogram" and the histogram having a small resolution of gradation "N" is called "rough resolution color histogram".

In the first embodiment, the resolution of gradation "Nb" in the fine image retrieving is selected to be 256 which corresponds to the highest resolution of gradation of the image retrieving apparatus in accordance with the first embodiment. The resolution of gradation "Na" in the rough image retrieving is selected to be smaller than the highest resolution of gradation of the image retrieving apparatus. In the first embodiment, the resolution of gradation "Na" in the rough image retrieving is selected to be 16 which is proper to show the color distribution by the histogram. It, however, is possible to select another value such as 32 as the resolution of gradation "Na" in the rough image retrieving.

Figure 4A:
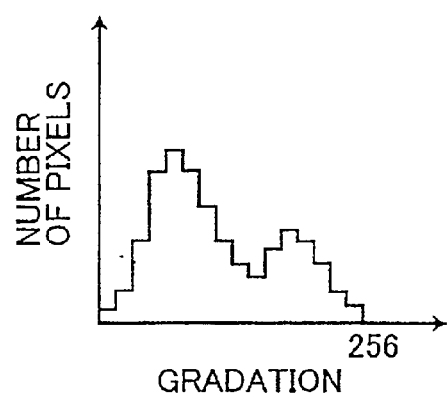
FIGS. 4A and 4B are graphs for showing examples of the color histograms respectively formed with the resolution of gradations N=16 and N=256.
Figure 4B:
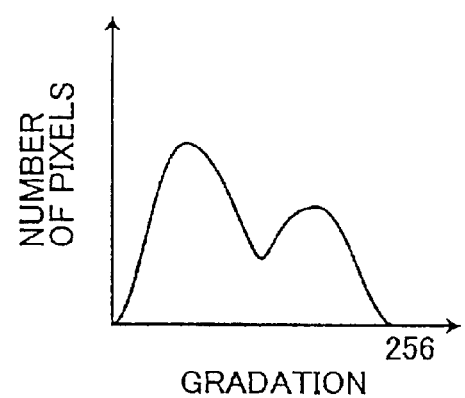

FIGS. 4A and 4B show examples of the color histograms which are formed from the same image data having the 256 gradations. FIG. 4A shows the color histogram having the resolution of gradation N=16. FIG. 4B shows the color histogram having the resolution of gradation N=256. For simplifying the explanation, the color histograms are abbreviated to be one-dimensional.

Since the resolution of gradation "Na" in the rough image retrieving is made smaller, the number of the gradation to be compared for calculating the similarity can be reduced. In the example shown in FIGS. 4A and 4B, the number of the gradation becomes $\frac{1}{16}$. Thus, the image retrieving can be made faster owing to the shortening of the calculation time.

The HQ histogram comparator 5 show in FIG. 1 compares the color histogram of the retrieving area of the input image with the color histogram of the retrieving image. The similarity judging unit 6 calculates the similarity "S" between the compared color histograms and judges whether the similarity "S" is higher than a predetermined level or not. In the rough image retrieving, the similarity "S" is compared with a predetermined first level "S1". In the fine image retrieving, the similarity "S" is compared with a predetermined second level "S2" which is larger than the first level "S1".

In the first embodiment, the first level "S1" is selected to be 0.5 (S1=0.5) which is a relatively low value. By such the selection, it is possible to retrieving an area including a human face portion as a candidate portion, even when the size of the human face portion is smaller than the retrieving area and the value of the similarity "S" becomes smaller. Furthermore, the second level "S2" is selected to be 0.8 (S2=0.8). By such the selection, the image retrieving can be executed more precisely in the fine image retrieving.

Figure 5A:
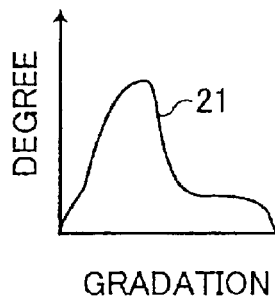
FIGS. 5A to 5C are graphs for showing a method for calculating a similarity between the color histograms.
Figure 5B:
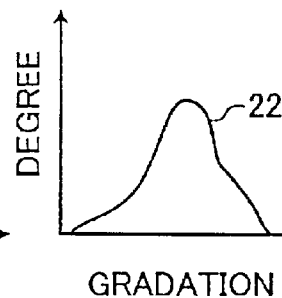
Figure 5C:
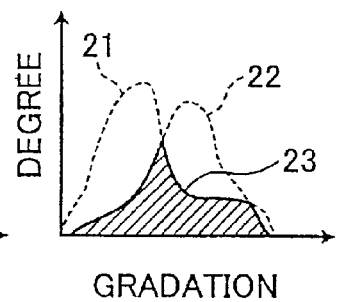

A method for calculating the similarity between the color histograms is described with reference to FIGS. 5A to 5C, 6A to 6E and 7A to 7E. FIG. 5A shows a normalized color histogram 21 which is formed from a retrieving area of the input image. FIG. 5B shows another normalized color histogram 22 formed from a retrieving image. FIG. 5C shows that the color histograms 21 and 22 are compared. FIGS. 6A to 6E shows steps for forming the color histogram and for judging the similarity in the rough image retrieving. FIGS. 7A to 7E shows steps for forming the color histogram and for judging the similarity in the fine image retrieving. In these figures, the histograms are abbreviated as one-dimensional.

For calculating the similarity "S", the degrees of the normalized color histograms 21 and 22 shown in FIGS. 5A and 5B are compared with respect to respective gradations, and the values of the degrees with respect to respective gradations are summed. Thus, the sum of the degrees in a hatched portion 23 with respect to respective gradation in FIG. 5C corresponds to the similarity "S" ($0 \leq S \leq 1$). The larger the similarity "S" becomes, the larger the degrees of the coincidence of both images become.

FIG. 6A shows a relation between an input image 11 and a retrieving area 12. FIG. 6B shows a retrieving image 13. In the first embodiment, the retrieving image 13 is a human face portion.

Figure 6C:
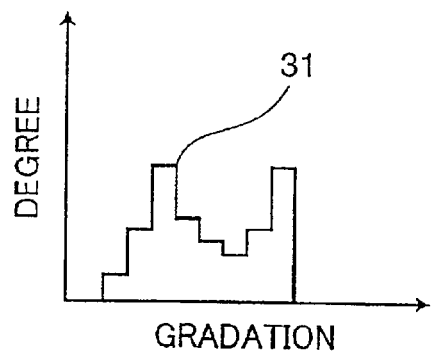
FIGS. 6C to 6E are graphs for showing a method for calculating a similarity between the color histograms in the rough image retrieving in the first embodiment.
Figure 6D:
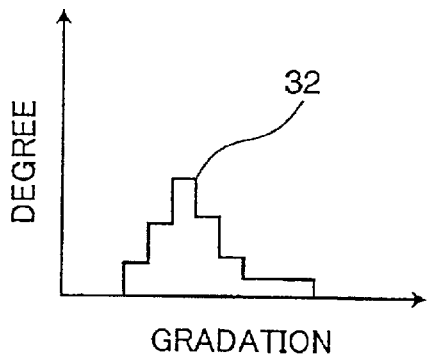

FIGS. 6C and 6D respectively show a normalized color histogram 31 of the retrieving area 12 and a normalized color histogram 32 of the retrieving image 13 which are formed by the HQ histogram forming unit 4. In the rough image retrieving, the resolution of gradation "Na" is selected to be relatively smaller (for example, Na=16).

Figure 6E:
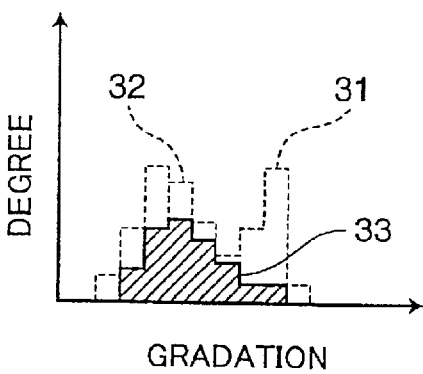

The color histograms 31 and 32 shown in FIGS. 6C and 6D are compared by the HQ histogram comparator 5, and a hatched portion 33 shown in FIG. 6E is obtained. A similarity "S" is calculated by the similarity judging unit 6 based on the hatched portion 33. Subsequently, the similarity "S" is compared with the first level "S1" and a candidate area is decided by the result of the comparison.

Figure 7B:
FIG. 7B is a drawing for showing the retrieving image to be retrieved in the fine image retrieving in the first embodiment.

FIG. 7A shows relations between the input image 11 and a candidate area 14 which is obtained by the rough image retrieving, and between the candidate area 14 and a retrieving area 15 (hatched portion). FIG. 7B shows the retrieving image 13.

Figure 7C:
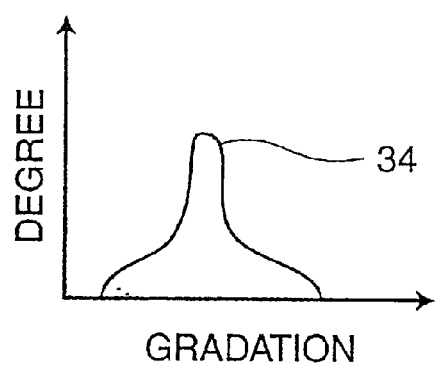
FIGS. 7C to 7E are graphs for showing a method for calculating a similarity between the color histograms in the fine image retrieving in the first embodiment.
Figure 7D:
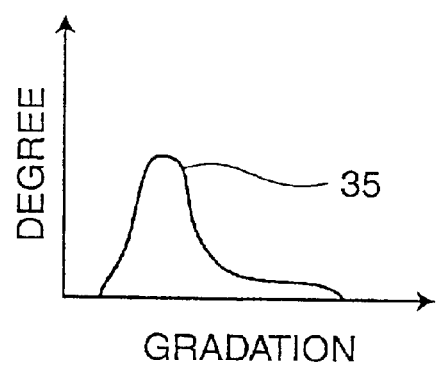

FIGS. 7C and 7D respectively show a normalized color histogram 34 of the retrieving area 15 and a normalized color histogram 35 of the retrieving image 13 which are formed by the HQ histogram forming unit 4. In the fine image retrieving, the resolution of gradation "Nb" is selected to be relatively larger (for example, Nb=256).

Figure 7E:
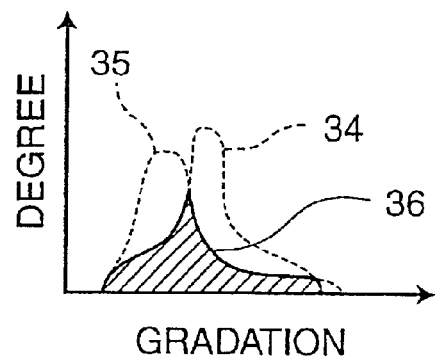

The color histograms 34 and 35 shown in FIGS. 7C and 7D are compared by the HQ histogram comparator 5, and a hatched portion 36 shown in FIG. 7E is obtained. A similarity "S" is calculated by the similarity judging unit 6 based on the hatched portion 36. Subsequently, the similarity "S" is compared with the second level "S2" and an area in which the retrieving image 13 is included is decided by the result of the comparison.

The area position memory 7 in FIG. 1 memorizes positions of the retrieving areas which have the similarities "S" larger than the first level "S1" or the second level "S2". In the rough image retrieving, the retrieving areas having the similarity "S" larger than the first level "S1" are memorized as the candidate areas which will be to be retrieved by the fine image retrieving. In the fine image retrieving, the retrieving area having the largest similarity "S" is memorized as the area in which the retrieving image 13 includes.

Figure 8:
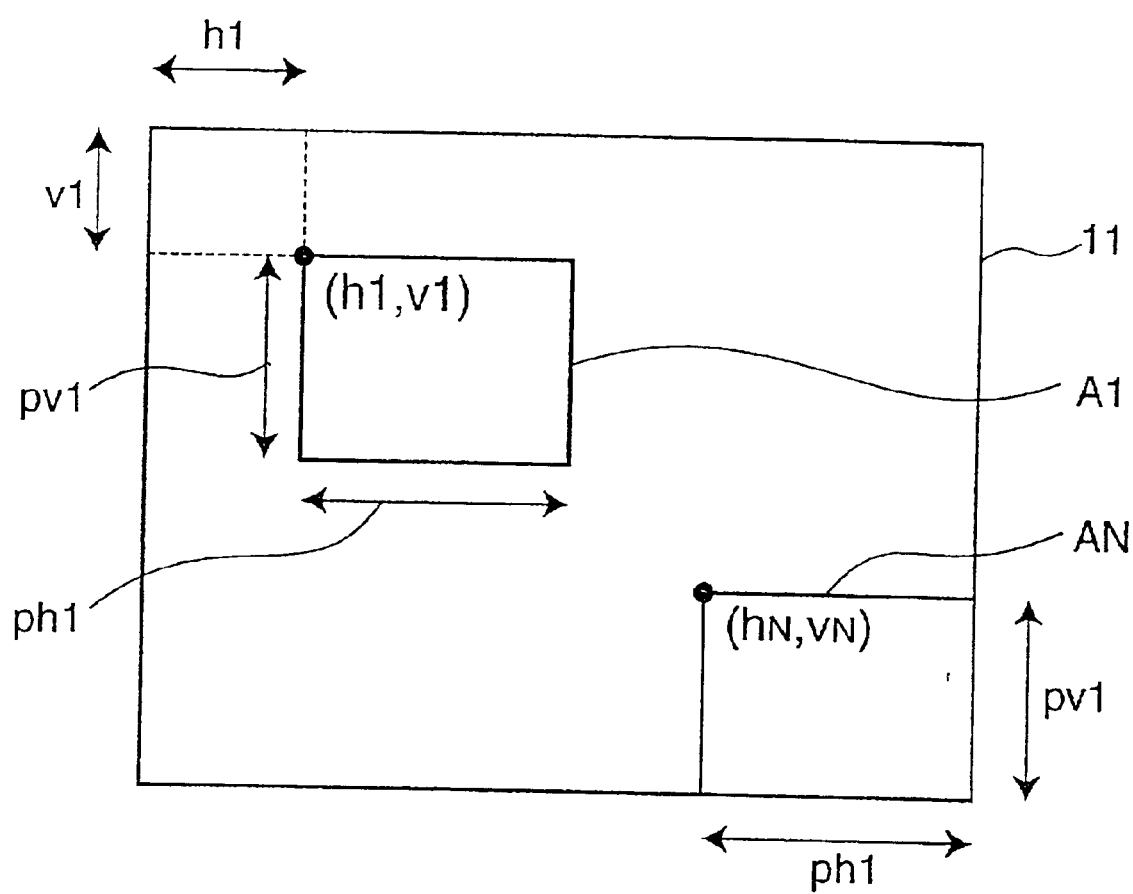
FIG. 8 is a drawing for showing an example of the candidate area obtained by the rough image retrieving in the first embodiment.

FIG. 8 shown an example of the candidate area obtained by the rough image retrieving. In this example, "N" number of the candidate areas are existed in the input image 11. A first candidate area A1 is memorized in the area position memory 7 as size information ph1 and pv1, and a position information of a coordinate (h1, v1) at the upper left end thereof. An N-th candidate area AN is memorized in the area position memory 7 as size information ph1 and pv1, and a position information of a coordinate (hN, vN) at the upper left end thereof.

The similar area information output unit 8 shown in FIG. 1 outputs the area including the retrieving image 13 memorized in the area position memory 7 as a result of the image retrieving.

Subsequently, steps of the image retrieving in the image retrieving apparatus in accordance with the first embodiment is described with reference to FIGS. 9A to 9F and 10. FIGS. 9A to 9F respectively show relations between the input image 11 and the retrieving area 12 or the like. FIG. 10 is a flowchart showing a main routine of the image retrieving steps.

Figure 9A:
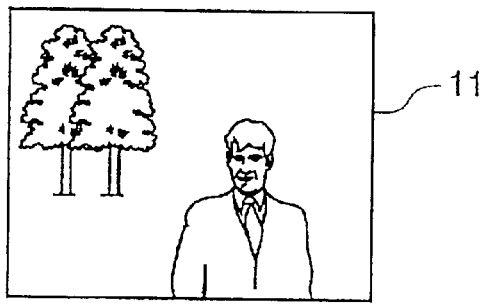
FIGS. 9A to 9F are drawings respectively for show relations between the input image and the retrieving area or the like in the image retrieving process in the first embodiment.
Figure 9B:
Figure 10:
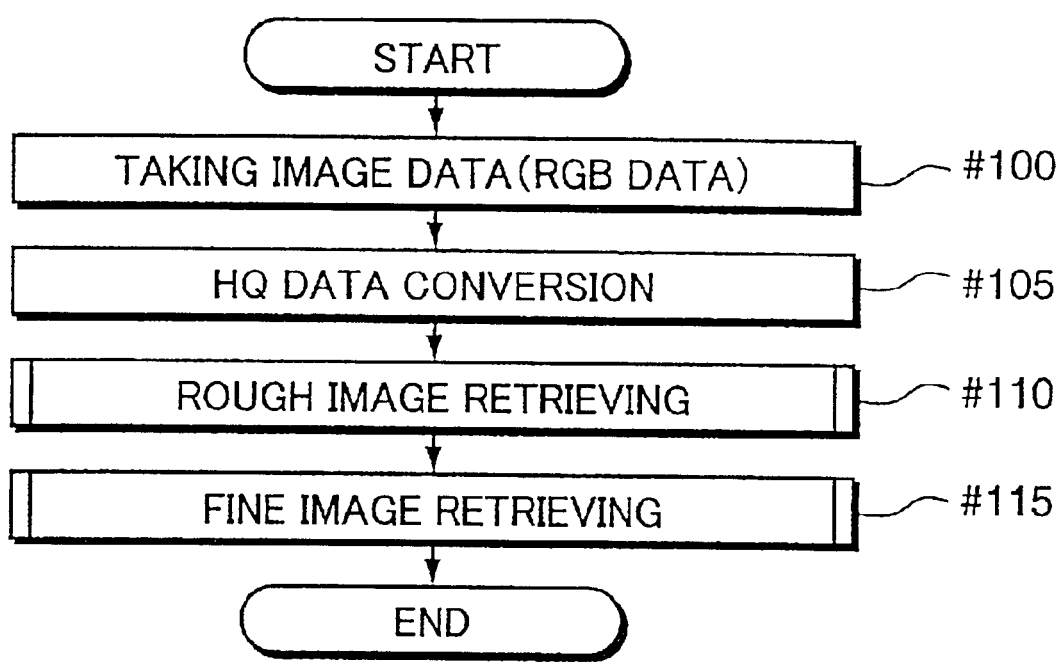
FIG. 10 is a flowchart for showing a main routine of the image retrieving steps in the first embodiment.

In the step #100 in FIG. 10, the input image 11 and the retrieving image 13 to be retrieved are taken as the image data based on the R, G and B signals (see FIGS. 9A and 9B). Subsequently, the image data based on the R, G and B signals are converted to other image data based on the H and Q data (#105).

Figure 9C:
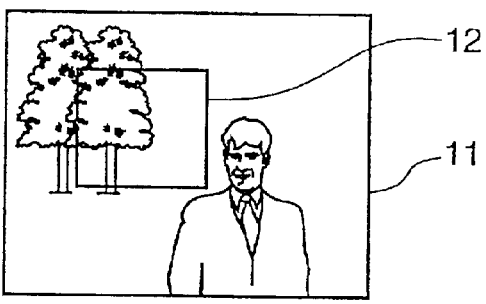
Figure 9D:
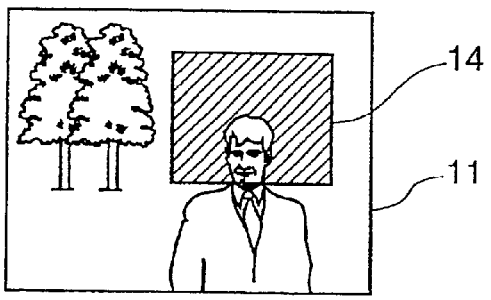

In the step #110, the rough image retrieving for obtaining candidate areas 14 in which the similarity "S" between the color histograms of the retrieving area 12 of the input image 11 and the retrieving image 13 is higher than the first level "S1" is executed (see FIGS. 9C and 9D). Details of the rough image retrieving will be described below with reference to FIG. 11 showing a subroutine flow.

Figure 9E:
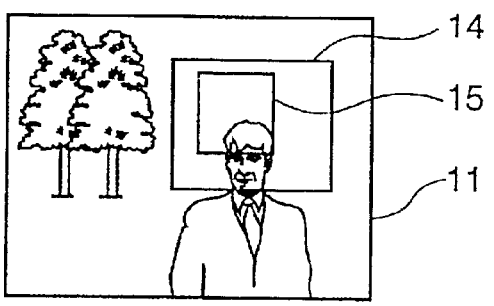
Figure 9F:
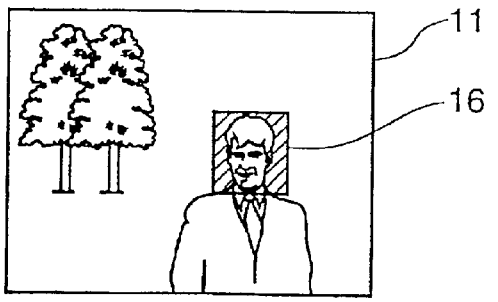
Figure 12:
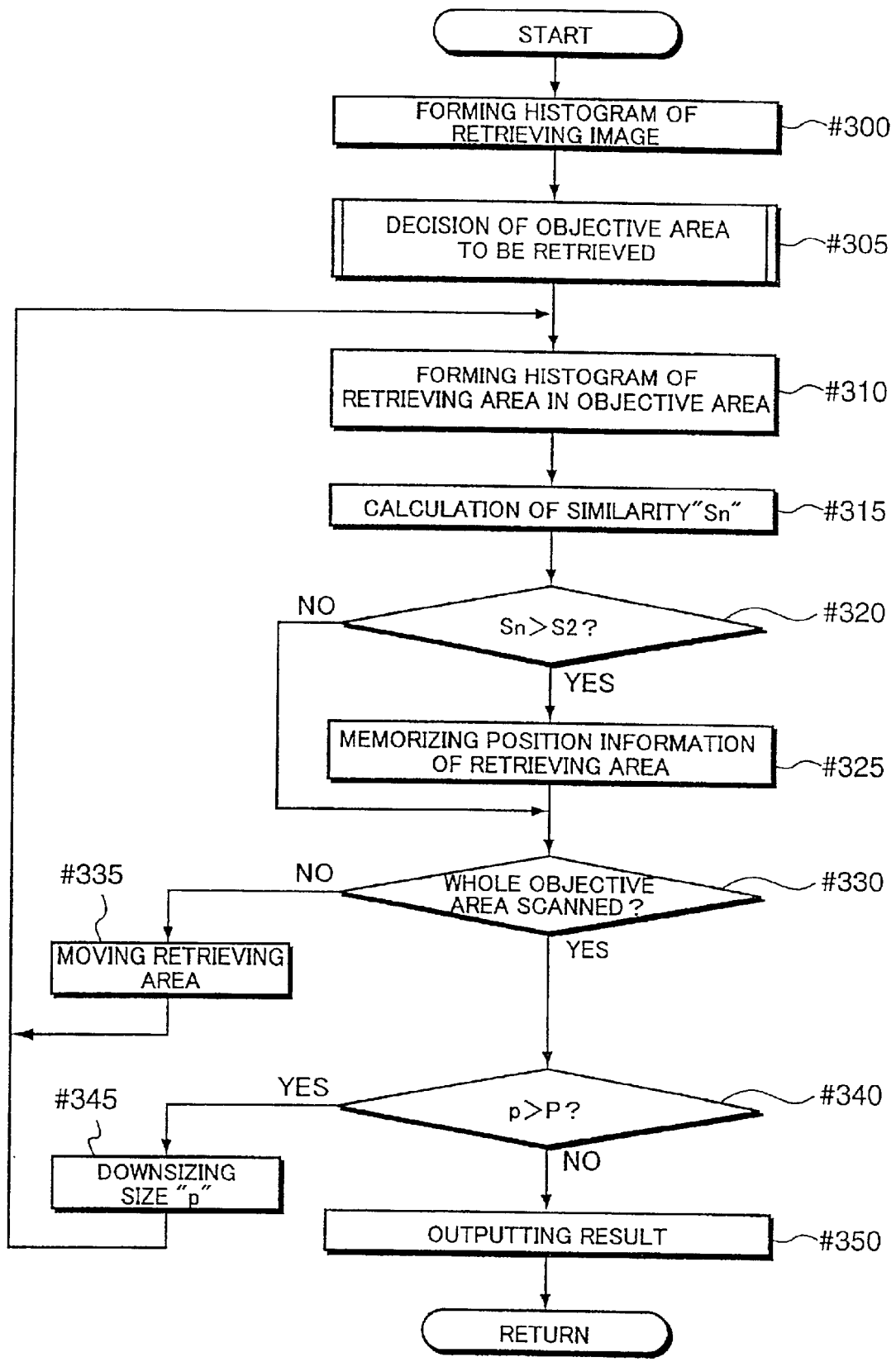
FIG. 12 is a flowchart for showing a subroutine of the fine image retrieving in step #115 in the main routine shown in FIG. 10.

Subsequently, in the step #115, the fine image retrieving for obtaining an area 16 including the retrieving image 13 by basing on the similarity "S" between the color histograms of the retrieving area 15 in the candidate area 14 and the retrieving image 13 is higher than the second level "S2" is executed (see FIGS. 9E and 9F). Details of the fine image retrieving will be described below with reference to FIG. 12 showing a subroutine flow.

Figure 11:
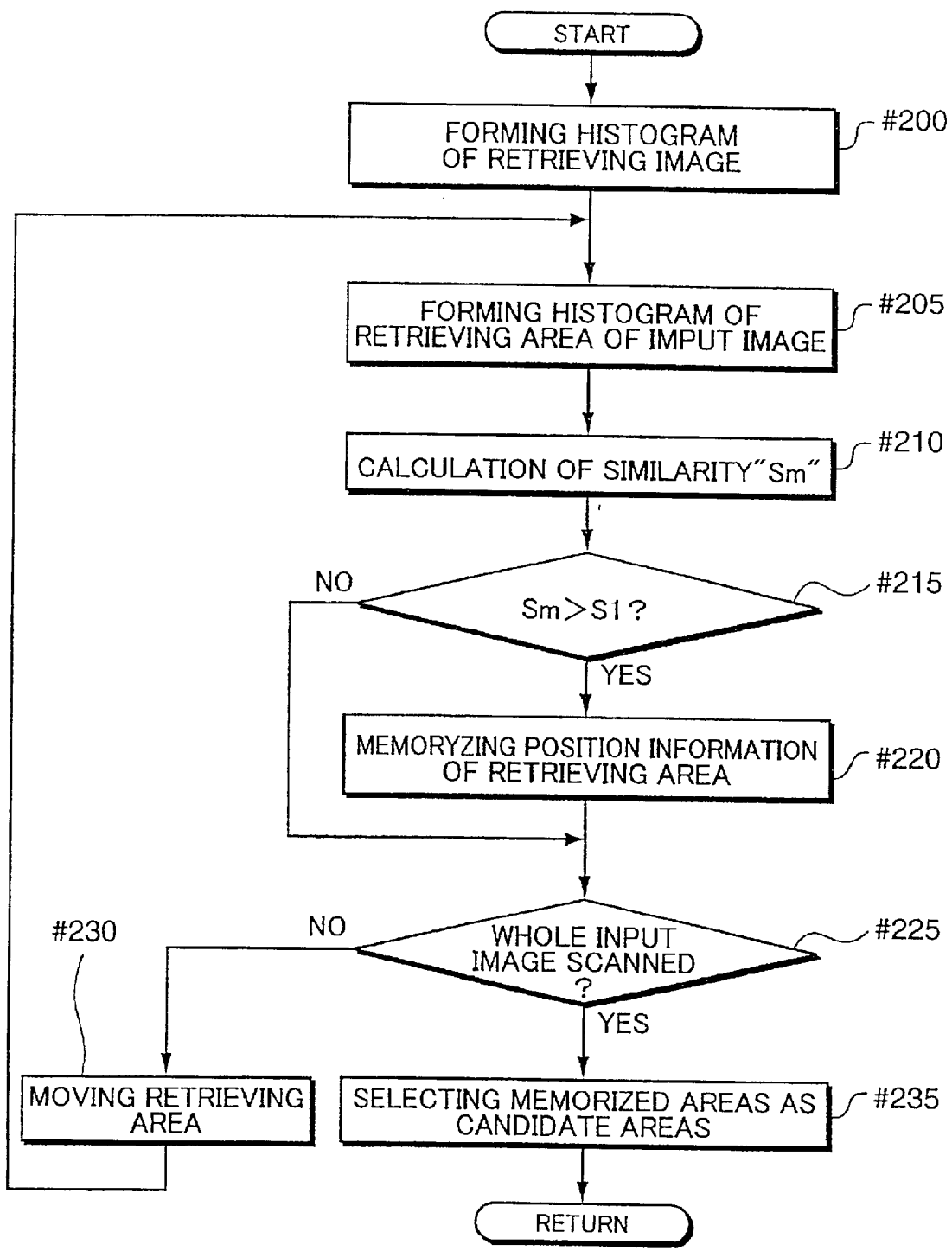
FIG. 11 is a flowchart for showing a subroutine of the rough image retrieving in step #110 in the main routine shown in FIG. 10.

In FIG. 11 showing the subroutine of the rough image retrieving in the step #110, a normalized color histogram of the retrieving image 13 is formed with the resolution of gradation Na=16 (#200). Subsequently, a normalized color histogram of the retrieving area 12 of the input image 11 is formed with the resolution of gradation Na=16 (#205).

A similarity "Sm" between the normalized color histograms is calculated (#210), and the similarity "Sm" is compared with the first level "S1" (#215). When the similarity "Sm" is larger than the first level "S1" (Sm>S1: YES in the step #215), the position information with respect to the retrieving area 12 is memorized in the area position memory 7 (#220).

When the similarity "Sm" is equal to or smaller than the first level "S1" (Sm≦S1: NO in the step #215) or when the position information is memorized in the step #220, it is judged whether the movement of the retrieving area 12 is scanned whole the input image 11 or not (#225). When the whole of the input image 11 has not been scanned (NO in the step #225), the retrieving area 12 is moved by the predetermined pitch kv1 in the vertical direction or kh1 in the horizontal direction (#230) and returns to the step #205. Alternatively, when the whole of the input image 11 has been scanned (YES in the step #225), the retrieving areas 12 memorized in the area position memory 7 in the step #220 are selected as the candidate areas 14 (#235), and this subroutine will be completed.

Figure 13:
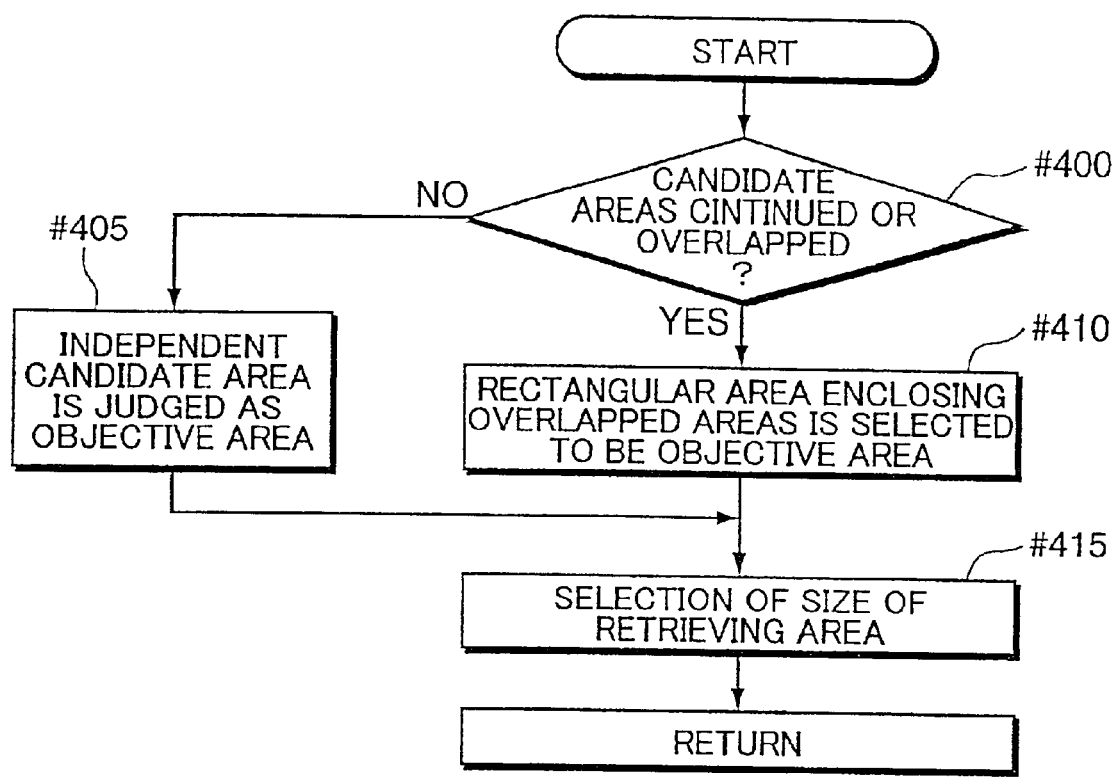
FIG. 13 is a flowchart for showing a subroutine for deciding an objective area in step #305 in the subroutine shown in FIG. 12.

In FIG. 12 showing the subroutine of the fine image retrieving in the step #115, a normalized color histogram of the retrieving image 13 is formed with the resolution of gradation Nb=256 (#300). Subsequently, an area to which the fine image retrieving is decided among the candidate areas 14 (#305). Details of the steps for deciding an objective area to be precisely retrieved will be described with reference to FIG. 13 showing a subroutine flow thereof.

A normalized color histogram of a retrieving area 15 in the objective area is formed with the resolution of gradation Nb=256 (#310). Subsequently, a similarity "Sn" between the normalized color histograms is calculated (#315), and the similarity "Sn" is compared with the second level "S2" (#320). When the similarity "Sn" is larger than the second level "S2" (Sn>S2: YES in the step #320), the position information with respect to the retrieving area 15 is memorized in the area position memory 7 (#325).

When the similarity "Sn" is equal to or smaller than the second level "S2" (Sn≦S2: NO in the step #320) or when the position information is memorized in the step #325, it is judged whether the movement of the retrieving area 15 is scanned whole the objective area or not (#330). When the whole of the objective area has not been scanned (NO in the step #330), the retrieving area 15 is moved by the predetermined pitch kv2 in the vertical direction or kh2 in the horizontal direction (#335) and returns to the step #310.

When the whole of the objective area has been scanned (YES in the step #330), a size "p" of the retrieving area 15 is compared with a predetermined size "P" (#340). When the size "p" of the retrieving area 15 is larger than the predetermined size "P" (p>P: YES in the step #340), the size "p" of the retrieving area 15 is downsized by the downsizing ratio "r" (#345), and returns to the step #310. Alternatively, when the size "p" of the retrieving area 15 is equal to or smaller than the predetermined size "P" (p≦P: NO in the step #340), the position information of the retrieving area 15 memorized in the area position memory 7 in the step #325 is outputted as the retrieving result (#350), and this subroutine flow will be completed.

In FIG. 13 showing the subroutine for deciding the objective area in the step #305, it is judged whether N number of the candidate areas retrieved by the rough image retrieving are continued or overlapped by basing on the coordinates (hi, vi) (i=1 to N) and the sizes (ph1, pv1) with respect to respective candidate areas (#400).

With respect to the independent candidate areas which are judged not to be continued or overlapped (NO in the step #400), each candidate area is judged as the objective area to be retrieved precisely (#405). In this case, the coordinate (shi, svi) of each objective area corresponds to the coordinate of each independent candidate area.

On the other hand, with respect to the candidate areas which are judged to be continued or overlapped (YES in the step #400), a rectangular area enclosing the continued or overlapped areas is selected as the objective area to be retrieved precisely (#410). Subsequently, an initial size of the retrieving area in the objective area having a length ph2 of a horizontal side and a length pv2 of a vertical side is selected (#415), and this subroutine flow will be completed.

Figure 14:
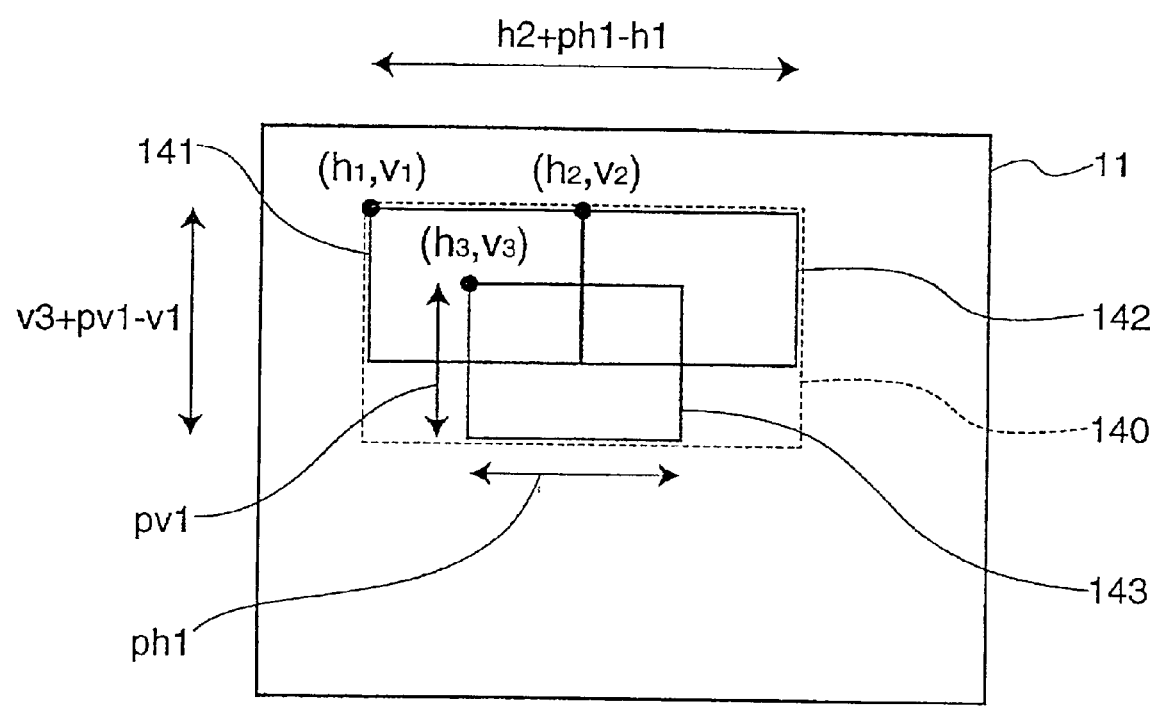
FIG. 14 is a drawing for showing an example that the candidate areas are continued and/or overlapped.

FIG. 14 shows an example that the candidate areas are continued and/or overlapped. When the candidate areas are continued and/or overlapped, the position information of an candidate area is compared with the position information of another candidate area. The smallest vales of the coordinates (hi, vi) of the candidate areas are designated by $hi_{min}$ and $vi_{min}$, and the largest values of them are designated by $hi_{max}$ and $vi_{max}$.

In the above-mentioned case, the coordinate (shi, svi) of the objective area is shown as (shi, svi)=($hi_{min}$, $vi_{min}$). The size of the objective area (a length ph2 of the horizontal side and a length pv2 of the vertical side thereof) is shown as $ph2 = hi_{max} + ph1 - hi_{min}$, and $pv2 = vi_{max} + pv1 - vi_{min}$.

It is assumed that the candidate areas 141, 142 and 143 shown in FIG. 14 are continued and/or overlapped. The coordinates of the candidate areas 141, 142 and 143 are respectively shown as (h1, v1), (h2, v2) and (h3, v3). The lengths of the horizontal and vertical sides of them are commonly to be ph1 and pv1. At this time, the minimum values of hi and vi correspond to h1 and v1. The maximum values of hi and vi correspond to h2 and v3. Thus, the coordinate the objective area 140 illustrated by dotted line in the figure becomes (h1, v1). The lengths ph2 and pv2 of the horizontal side and the vertical side of it will be $ph2 = h2 + ph1 - h1$, and $pv2 = v3 + pv1 - v1$.

In the above-mentioned first embodiment, the candidate areas 14 having a possibility that the retrieving image 13 is included are retrieved at first by executing the rough image retrieving with using color histograms 31 and 32 having low resolution of gradation "Na". Subsequently, the area including the retrieving image 13 is retrieved by executing the fine image retrieving with using the color histograms 34 and 35 having high resolution of gradation "Nb" in the candidate areas 14. Since the resolution of gradation "Na" used in the rough image retrieving is lower, it is possible to reduce the burden of the calculation in the rough image retrieving and to shorten the time necessary for the image retrieving. Furthermore, the fine image retrieving is executed with respect to only the candidate areas 14 obtained in the rough image retrieving. Thus, it is possible to reduce the total burden of the calculation and to shorten the time necessary for retrieving the image.

The pitches kh2 and kv2 of the movement of the retrieving area 15 in the fine image retrieving are respectively selected to be one pixel, so that it is possible to prevent the missing of the image retrieving. The pitches kh1 and kv1 of the movement of the retrieving area 12 in the rough image retrieving are respectively selected to be larger than the pitches kh2 and kv2 (kh1>kh2, kv1>kv2), so that it is possible to shorten the time necessary for the rough image retrieving.

In the rough image retrieving, since the first level "S1" serving as a threshold value for judging the similarity "S" is selected to be relatively small value such as 0.5 (S1=0.5), it is possible to prevent the missing of the image retrieving. In the fine image retrieving, since the second level "S2" is selected to be relatively large value such as 0.8 (S2=0.8>S1), it is possible to execute the fine image retrieving with a high accuracy. Furthermore, since the second level "S2" is selected not to be so large value such as 0.9 or 0.95, it is possible to retrieve not only the same image as the retrieving image 13 but also the image similar to the retrieving image such as a face of another person. Thus, the image retrieving method in accordance with the first embodiment can be applied for processing the most suitable image processing to a human image among the input images.

Figure 15:
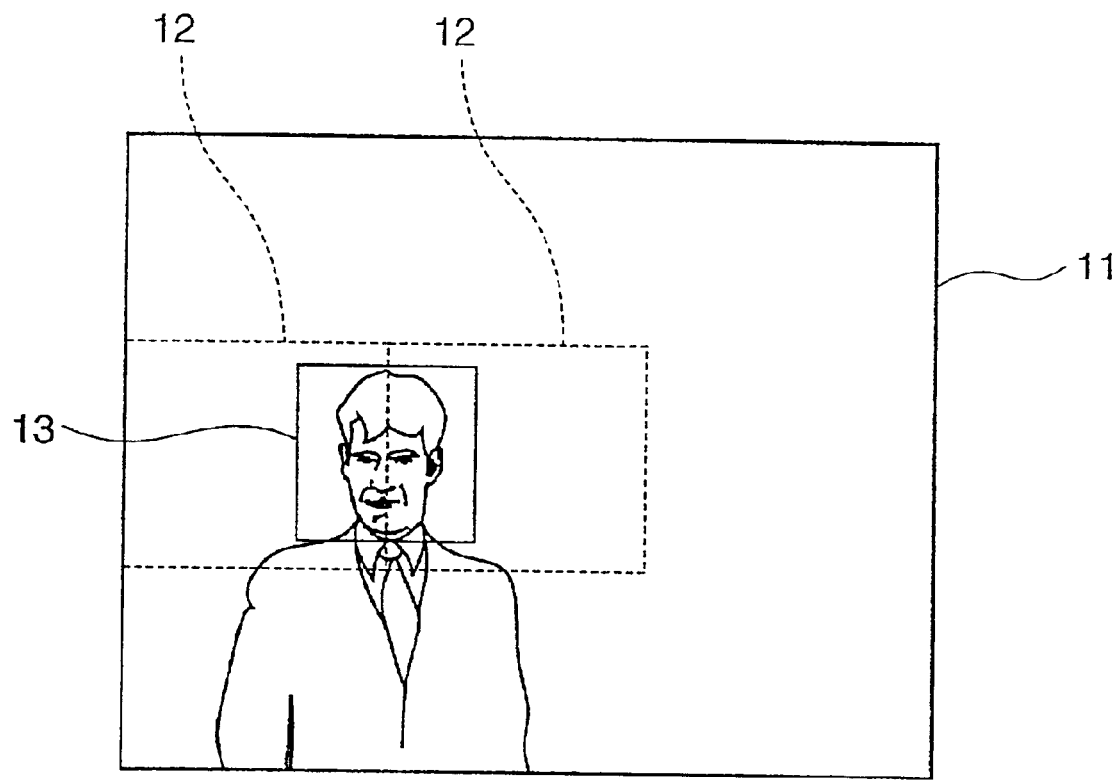
FIG. 15 is a drawing for showing an example that a retrieving image is disposed for bridging two retrieving areas.

Modifications of the first embodiment will be described below. In the first embodiment, the pitches kh1 and kv1 of the movement of the retrieving area 12 in the rough image retrieving are selected to be kh1≈ph1/2 and kv1≈pv1/2. The pitches kh1 and kv1 in the rough image retrieving are not restricted by the above-mentioned example. For example, when the pitches kh1 and kv1 in the rough image retrieving are selected to be kh1≈ph1 and kv1≈pv1 which are substantially the same as the lengths of the sides of the retrieving area 12, there is a possibility that the retrieving image 13 disposed for bridging the retrieving areas 12 as shown in FIG. 15 cannot be retrieved. Thus, it is preferable to select the pitches kh1 and kv1 of the movement of the retrieving image in the rough image retrieving smaller than half values of the lengths of the horizontal side and the vertical side of the retrieving area 12.

The coordinate at the upper left end of the retrieving area 12 or 15 is memorized as the position information of the candidate area or the area including the retrieving image. It, however, is possible to memorize the coordinate at the center of the retrieving area 12 or 15 as the position information.

The first level "S1" and the second level "S2" serving as the threshold values for judging the similarity "S" are respectively selected to be S1=0.5 and S2=0.8. The values of the first level "S1" and the second level "S2" can be varied corresponding to the desired accuracy of the image retrieving.

In the above-mentioned first embodiment, the hue (H) and the compensated saturation (Q) are used as the color space. It, however, is possible to use the R, G and B signals. Furthermore, it is possible to use another color system such as the HIS (Hue, Intensity, Saturation) color system, the L*a*b* color system, or the L*u*v* color system.

It is possible further to provide an operating unit 91 illustrated by dotted line in FIG. 1 showing the configuration of the image retrieving apparatus in accordance with the first embodiment. By such a modification, it is possible to input the values of the parameters such as the values of the resolution of gradation "Na" and "Nb", the sizes of the retrieving areas 12 and 15, the values of the pitches kh1, kh2, kv1 and kv2, the values of the first level "S1" and the second level "S2", and so on by using the operating unit 91.

In the above-mentioned first embodiment, the retrieving image 13 is taken by the image input unit 1. It, however, is possible further to provide an retrieving data memory 92 illustrated by dotted line in FIG. 1. The data with respect to the retrieving image 13 is previously memorized in the retrieving data memory 92. In this modification, it is possible to memorize the R, G and B signals as the data of the retrieving image 13. Alternatively, it is possible to memorize the H and Q data converted from the R, G and B signals as the data of the retrieving image 13.

Furthermore, it is possible to memorize the normalized color histogram based on the H and Q data as the data of the retrieving image 13 in the retrieving data memory 92. In this case, it is further possible to memorize the normalized color histograms which are formed with both of the resolution of gradation "Na" and "Nb". Alternatively, it is possible to memorize the normalized color histogram with the resolution of gradation "Nb" only. The normalized color histogram with the resolution of gradation "Na" is calculated from the normalized color histogram with the resolution of gradation "Nb".

Figure 16:
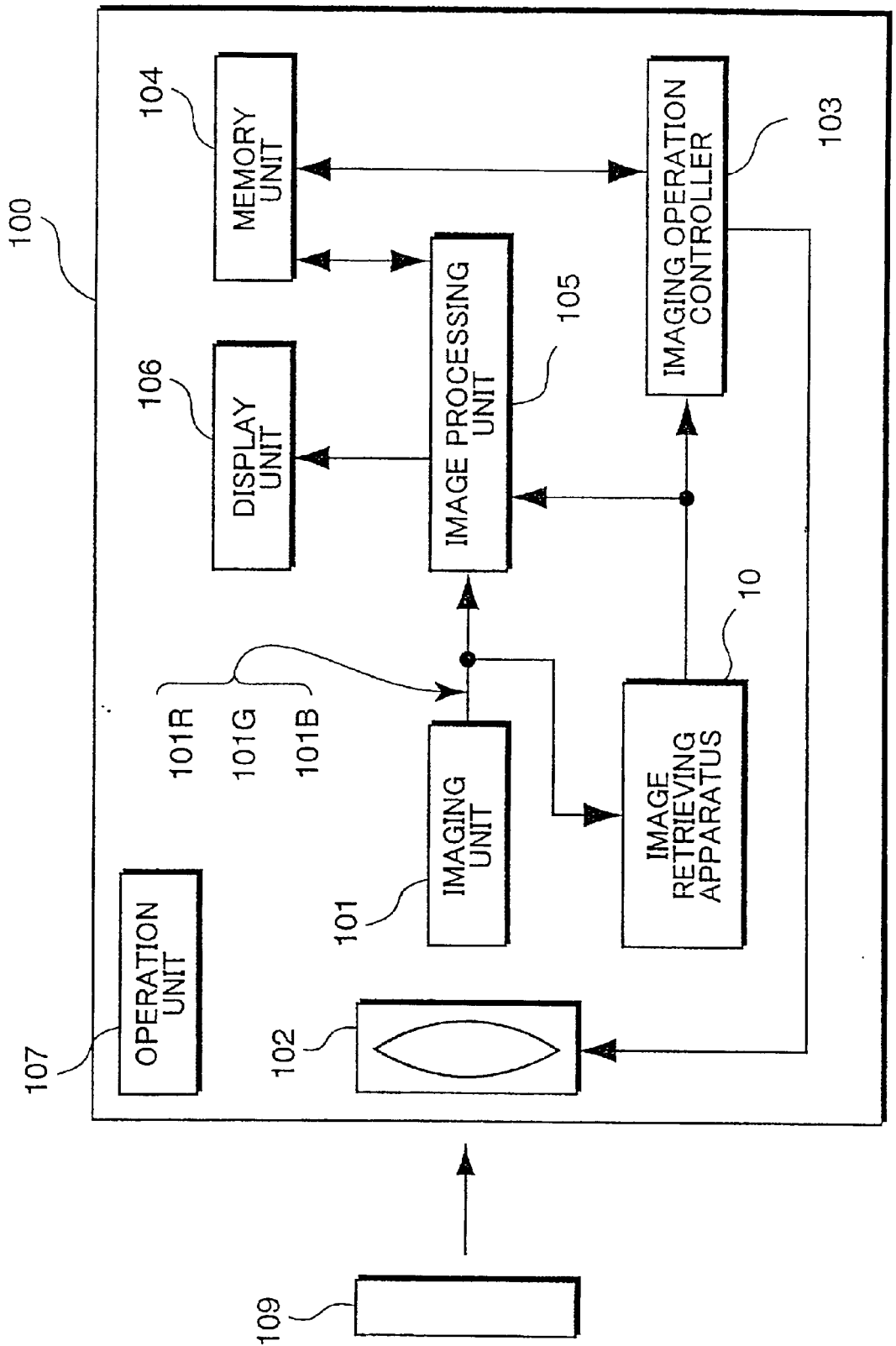
FIG. 16 is a block diagram for showing an example of an electric configuration of a digital still camera using the image retrieving apparatus in accordance with the first embodiment.

FIG. 16 shows a block diagram for showing an example of an electric configuration of a digital still camera using the image retrieving apparatus in accordance with the first embodiment.

An imaging unit 101 of the digital still camera 100 includes an area imaging device such as CCD, in which a plurality of photo-electro converting elements are arranged in two-dimensional, a set of color filters are disposed in front of each photo-electro converting elements. The imaging unit 101 converts optical energy corresponding to an image of an object 109 to electrical color image signals 101R, 101G and 101B corresponding to the color filters and outputs the color image signals 101R, 101G and 101B.

An optical lens system 102 includes a taking lens, an aperture and a driving mechanism for moving the taking lens and the aperture. The optical lens system 102 focuses the image of the object 109 on the surface of the imaging device of the imaging unit 101.

An image retrieving apparatus 10 corresponds to that shown in FIG. 1. The imaging retrieving apparatus 10 retrieves whether an input image corresponding to the color image signals 101R, 101G and 101B includes a human face portion (the object 109 includes a human face portion) or not prior to a shutter switch in an operation unit 107 is switched on.

An imaging operation controller 103 controls the driving mechanism of the optical lens system 102 by following a control program memorized in a memory unit 104. The imaging operation controller 103 executed an automatic focusing control for focusing the focus of the taking lens of the optical lens system 102 on the human face portion of the object retrieved by the image retrieving apparatus 10.

Furthermore, the imaging operation controller 103 executes an automatic exposure control for driving the driving mechanism of the optical lens system 102 and the imaging unit 101 so as to take a predetermined aperture value and a predetermined shutter speed (or exposing time) by which the human face portion becomes a proper exposure value.

In this example, the proper exposure value is EV±0 with respect to a proper exposure value corresponding to the sensitivity of the imaging device. When the exposure value is designated by eight bit data (0 to 255), a mean value of luminance Y in the retrieving area satisfies $100 \leq Y \leq 150$.

The mean value of luminance Y can be obtained by the following equation, when the values of the color imaging signals 101R, 101G and 101B are respectively designated by symbols "R", "G" and "B".

$$Y=0.299R+0.587G+0.114B$$

An image processing unit 105 executes predetermined image processing to the color image signals 101R, 101G and 101B by following a control program memorized in the memory unit 104. The image processing unit 105 executes an automatic white balance control for adjusting the ratio of the output of the color image signals 101R and 101B with respect to the color image signal 101G so that the color data corresponding to the human face portion is included in a proper area 108 as shown in FIG. 17.

Figure 17:
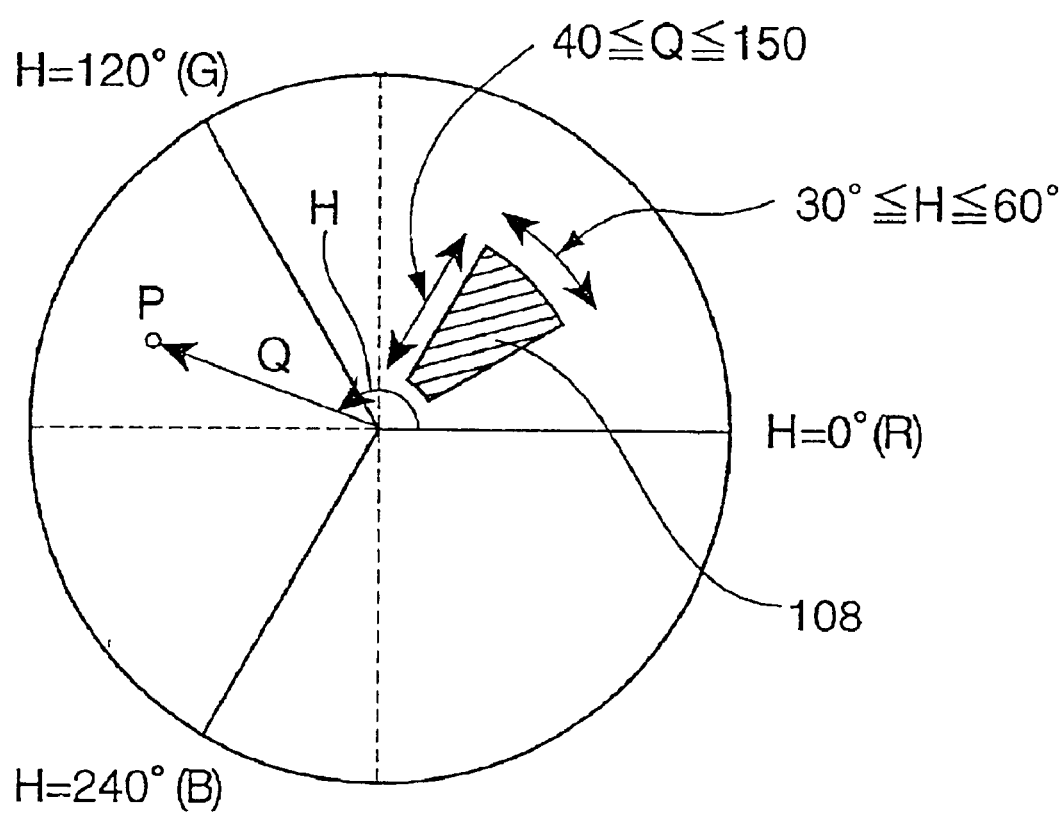
FIG. 17 is an HQ chromaticity diagram for showing an area in which a color of human skin can be reproduced properly.

FIG. 17 is an HQ chromaticity diagram for showing an area in which a color of human skin can be reproduced properly. On the HQ chromaticity diagram, a direction toward 0° corresponds red (R), a direction toward +120° corresponds green (G) and a direction toward +240° (−120°) corresponds blue (B). For example, a color data at a point "P" can be designated by hue (H) which is an angle from 0°, and compensated saturation (Q) which is a distance from the center of the chromaticity diagram.

In the example shown in FIG. 17, the proper area 108 is enclosed by $30° \leq H \leq 60°$ and $40 \leq Q \leq 150$. Since the digitalized value is shown by eight bit data (0 to 255), so that the compensated saturation Q takes a value between 0 to 255.

The image processing unit 105 adjusts the ratio of the output of the color image signals 101R and 101B with respect to the color image signal 101G so that the color data corresponding to the human face portion is included in a proper area 108 as shown in FIG. 17, when the color image signals 101R, 101G and 101B are converted to the H and Q data by following the above-mentioned equations (1) and (2).

It is possible to memorize the proper area 108 in the memory unit 104, previously. Alternatively, it is possible to input the proper area 108 by using the operation unit 107.

Furthermore, image processing unit 105 varies a degree for edge emphasizing operation with respect to the retrieving area equal to or smaller than a predetermined level, when the human face portion is retrieved in the input image by the image retrieving apparatus 10. At this time, the degree for edge emphasizing operation is reduced corresponding to the size of the retrieving area including the human face portion or the size of the human face portion.

Table 1 shows the degree for the edge emphasizing operation and the gradation characteristic (γ) with respect to each region of the size of the human face portion. FIGS. 18A to 18C respectively show examples of filters used in the edge emphasizing operation. FIG. 18A shows the filter having a high degree of edge emphasizing effect. FIG. 18B shows the filter having a middle degree of edge emphasizing effect. FIG. 18C shows the filter having a low degree of edge emphasizing effect.

TABLE 1

| RATIO OF HUMAN FACE PORTION | DEGREE OF EDGE EMPHASIZING | GRADATION CHARACTERISTIC |
|---|---|---|
| LARGE (30 to 100%) | WEAK | γ = 0.4 (a in FIG. 19) |
| MIDDLE (10 to 30%) | MIDDLE | γ = 0.45 (b in FIG. 19) |
| SMALL (5 to 10%) | MIDDLE | γ = 0.5 (c in FIG. 19) |
| NOT RETRIEVED | STRONG | γ = 0.55 (d in FIG. 19) |

As can be seen from table 1, when the ratio of the size of the retrieving area including the human face portion with respect to the size of the input image is in the range from 30 to 100%, the filter shown in FIG. 18C having the low degree for edge emphasizing effect is used for emphasizing the edge of the retrieving area including the human face portion. When the ratio of the size of the retrieving area including the human face portion with respect to the size of the input image is in the range from 5 to 30%, the filter shown in FIG. 18B having the middle degree for edge emphasizing effect is used for emphasizing the edge of the retrieving area. On the other hand, when the human face portion is not retrieved in the input image, the filter shown in FIG. 18A having the high degree for edge emphasizing effect is used for emphasizing the edge of the retrieving area.

Still furthermore, the image processing unit 105 varies the gradation compensation process with respect to whole the input image corresponding to the size of the retrieving area including the human face portion or the size of the human face portion.

Figure 19:
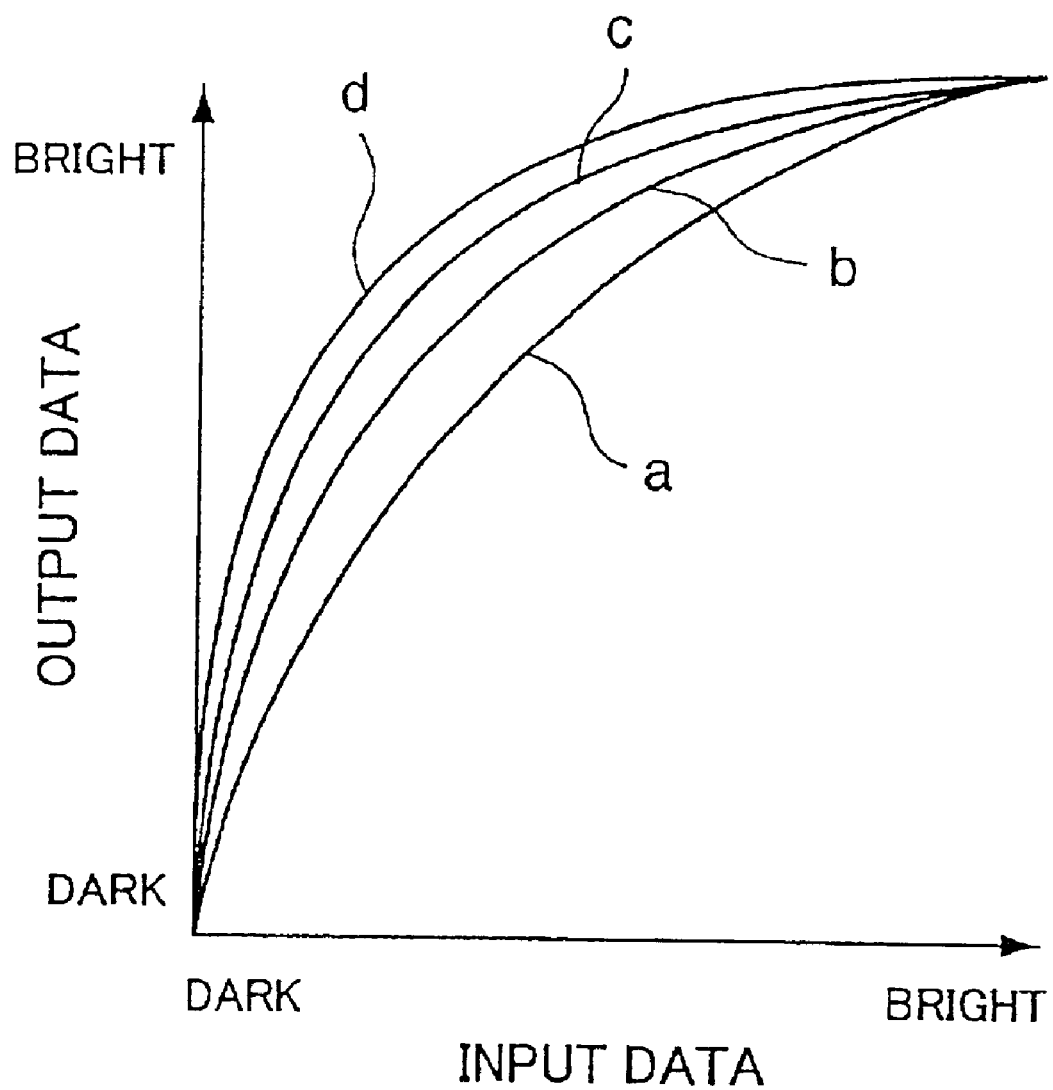
FIG. 19 is a graph for showing examples of gradation characteristics (γ characteristic curves) used in gradation compensation process in the digital still camera in accordance with the first embodiment.

FIG. 19 shows examples of the gradation characteristics (γ characteristic curves) used in the gradation compensation process by the image processing unit 105.

As can be seen from table 1, when the ratio of the size of the retrieving area including the human face portion with respect to the size of the input image is in the range from 30 to 100%, the γ characteristic curve "a" (γ=0.4) shown in FIG. 19 is used for compensating the gradation. When the ratio of the size of the retrieving area including the human face portion with respect to the size of the input image is in the range from 10 to 30%, the γ characteristic curve "b" (γ=0.45) shown in FIG. 19 is used for compensating the gradation. When the ratio of the size of the retrieving area including the human face portion with respect to the size of the input image is in the range from 5 to 10%, the γ characteristic curve "c" (γ=0.5) shown in FIG. 19 is used for compensating the gradation. On the other hand, when the human face portion is not retrieved in the input image, the γ characteristic curve "d" (γ=0.55) shown in FIG. 19 is used for compensating the gradation.

A boundary, for example, 30% of the regions of the ratio of the size of the retrieving area with respect to the size of the input image are to be included in one of the adjoining two regions. The boundaries are not restricted by the examples shown in table 1. It is possible to select proper values corresponding to the characteristic of the digital still camera 100.

The image data of the object 109 after the image processing by the image processing unit 105 is memorized in the memory unit 104 or displayed on a display unit 106. The memory unit 104 is, for example, configured by a ROM, a RAM, an EEPROM or the like. The display unit 106 is configured by, for example, an LCD.

The above-mentioned modification is described with respect to the digital still camera. The image retrieving apparatus 10 in accordance with the first embodiment can be applied to another imaging apparatus such as a digital video camera for recording a movie.

Figure 20:
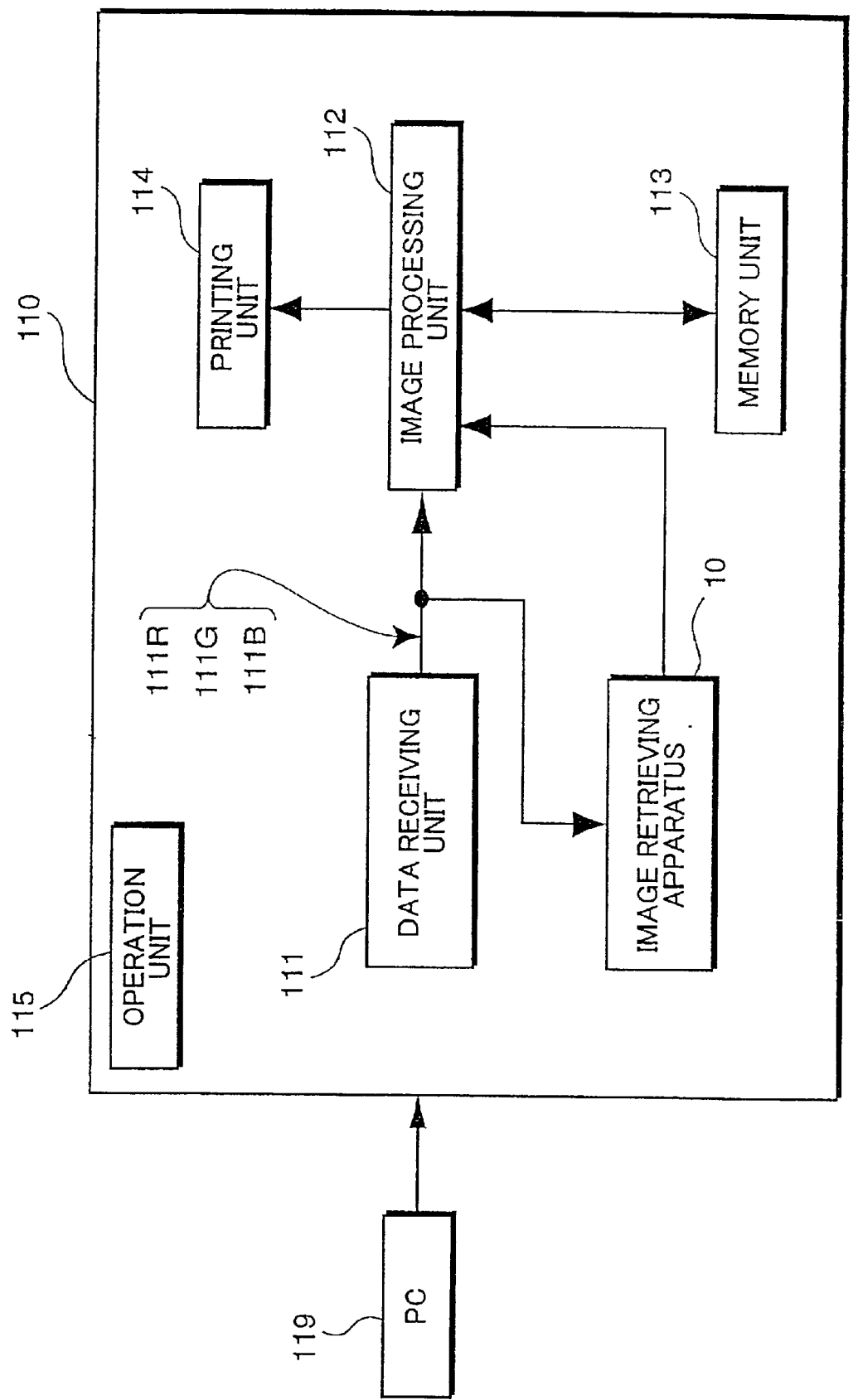
FIG. 20 is a block diagram for showing an example of an electric configuration of a printer using the image retrieving apparatus in accordance with the first embodiment

FIG. 20 shows a block diagram for showing an example of an electric configuration of a printer using the image retrieving apparatus in accordance with the first embodiment.

A data receiving unit 111 of the printer 110 receives an image data based on the R, G and B signals transmitted from, for example, a personal computer (PC), and outputs the color image signals 111R, 111G and 111B.

An image retrieving apparatus 10 corresponds to that shown in FIG. 1. The imaging retrieving apparatus 10 retrieves whether an input image corresponding to the color image signals 101R, 101G and 101B includes a human face portion or not.

An image processing unit 112 executes image processing operation to the color image signals 111R, 111G and 111B so as to print an image including a human portion properly by following a control program memorized in a memory unit 113. The image processing unit 112 adjusts the ratio of the output of the color image signals 111R, 111G and 101B so that the luminance corresponding to the human face portion becomes proper.

In this example, the proper value of the luminance is defined that a mean value of luminance Y in the retrieving area satisfies 100≦Y≦150, when the luminance value is designated by eight bit data (0 to 255).

The mean value of luminance Y can be obtained by the following equation, when the values of the color imaging signals 111R, 111G and 111B are respectively designated by symbols "R", "G" and "B".

$$Y=0.299R+0.587G+0.114B$$

The image processing unit 112 further executes a color balance processing for adjusting the ratio of the output of the color image signals 111R, 111G and 111B so that the color data corresponding to the human face portion is included in a proper area 108 as shown in FIG. 17. By such the color balance processing, the human face portion can be printed with a proper color.

It is possible to memorize the proper area 108 in the memory unit 113, previously. Alternatively, it is possible to input the proper area 108 by using the operation unit 115.

Furthermore, image processing unit 112 varies a degree for edge emphasizing operation with respect to the retrieving area corresponding to the size of the retrieving area including the human face portion with respect to the size of the input image, similar to the above-mentioned digital still camera 100. By such the image processing, it is possible to restrict the sharpness of the human face portion so as not to be much higher, so that the human face portion can be printed properly.

Still furthermore, the image processing unit 112 varies the gradation compensation process with respect to whole the input image corresponding to the size of the retrieving area including the human face portion or the size of the human face portion as shown in FIG. 19, similar to the above-mentioned digital still camera 100. By such the image processing, it is possible to restrict the gradation of the human face portion so as not to be much higher, so that the human face portion can be printed with proper gradation.

The image data processed by the image processing unit 112 is used by a printing unit 114 for printing the image on a paper sheet.

Second Embodiment

A second embodiment of the present invention is described with reference to the drawings.

Figure 21:
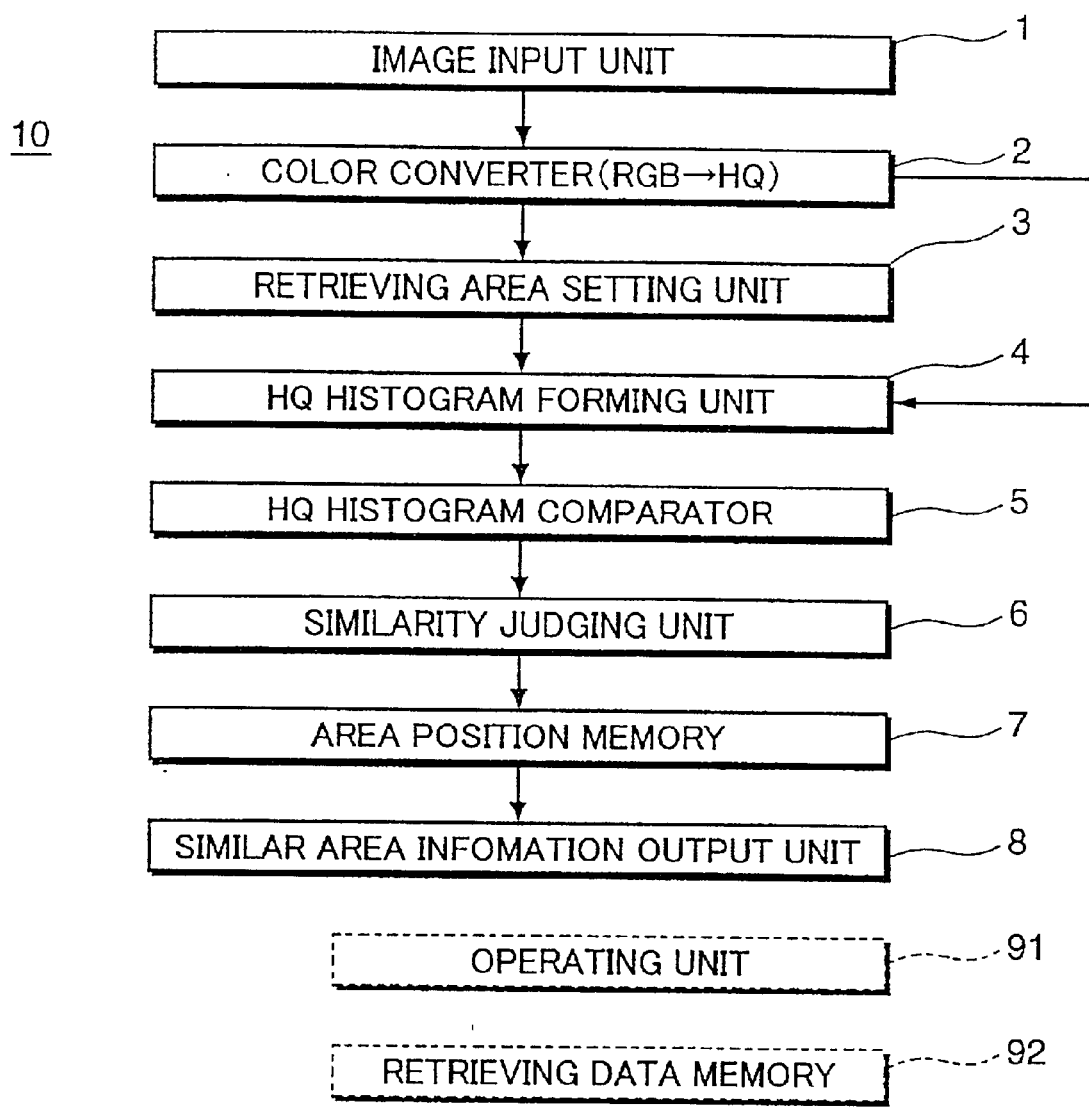
FIG. 21 is a block diagram of an image retrieving apparatus in accordance with a second embodiment of the present invention.

FIG. 21 shows a block diagram of an image retrieving apparatus in accordance with the second embodiment. The image retrieving apparatus 10 comprises an image input unit 1, a color converter 2, a retrieving area setting unit 3, an HQ histogram forming unit 4, an HQ histogram comparator 5, a similarity judging unit 6, an area position memory 7, and a similar area information output unit 8.

In comparison with FIGS. 1 and 21, it is found that the image retrieving apparatus 10 in the second embodiment is very similar to that in the first embodiment, so that the explanation of the common elements are omitted.

The image retrieving apparatus 10 retrieves whether an input image 11 (see FIG. 22A) includes a retrieving image 13 (see FIG. 22B) similar to a retrieving image of an object to be retrieved or not by comparing the color histograms of the image in an area of the input image and the retrieving image.

Figure 22A:
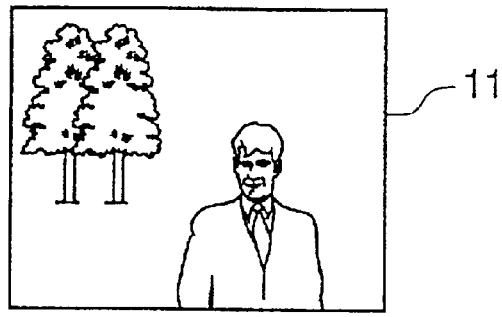
FIGS. 22A to 22E are drawings respectively for show relations between an input image and a retrieving area or the like in image retrieving process in the second embodiment.
Figure 22B:
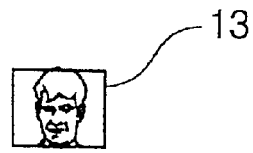
Figure 22C:
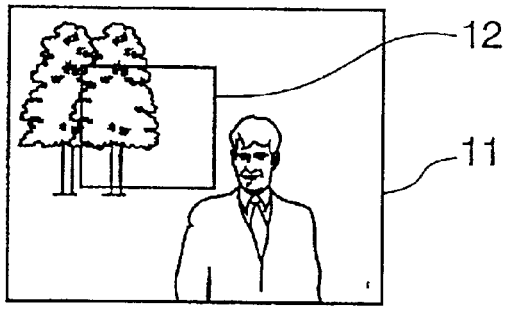

In the image retrieving by the image retrieving apparatus 10 in accordance with the second embodiment, a retrieving area 12 having an optional size is selected in the input image 11 as shown in FIG. 22C. The retrieving area 12 is moved in predetermined directions at a predetermined pitch so as to scan whole the input image 11. A color histogram of an image in each retrieving area 12 is compared with a color histogram of the retrieving image 13. In the second embodiment, it is possible to retrieve several sizes of the retrieving image 13 by varying the size of the retrieving area 12.

When the number of pixels in the retrieving area 12 or the retrieving image 13 is equal to or smaller than a predetermined value due to the pixel density of the input image 11 is smaller or the size of the input image 11 is smaller, the image retrieving apparatus 10 generates smoothed color histograms in order to prevent the reduction of the image retrieving performance. In the second embodiment, a human face portion is used as the retrieving image to be retrieved as shown in FIG. 22B.

The image input unit 1 takes an input image 11 and a retrieving image 13. For example, the input image 11 has 640 (horizontal direction)×480 (vertical direction) pixels, and the retrieving image 13 has 15×15 pixels. The input image 11 and the retrieving image 13 are respectively taken as an eight bit image data configured by R(red), G(green) and B(blue) color signals.

The color converter 2 converts the image data configured by R(red), G(green) and B(blue) color signals to another image data configured by hue (H) and compensated saturation (Q) by the above-mentioned equations (1) and (2) in the first embodiment.

The retrieving area setting unit 3 sets the size of the retrieving area 12 which is to be compared with the retrieving image 13. In the second embodiment, the retrieving area 12 has a rectangular shape, and an initial size "p" of the retrieving area 12 is selected to be ⅘ of the size of the input image 11. The retrieving area setting unit 3 further moves the retrieving area 12 by a predetermined pitch in each predetermined direction. The image retrieving is executed after each movement of the retrieving area 12.

Figure 22D:
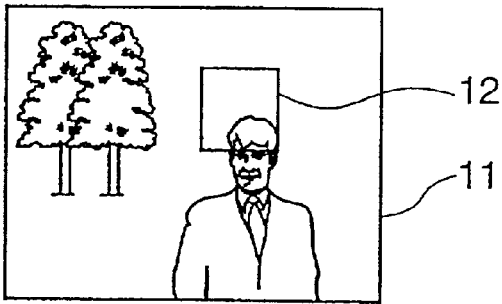

When the image retrieving of the whole input image 11 by moving the retrieving area 12 is completed, the size "p" of the retrieving area 12 is reduced by a downsizing ratio "r", as shown in FIG. 22D. The image retrieving will be repeated by the same manner until the size "p" of the retrieving area 12 becomes equal to or smaller than a predetermined size "P".

In the second embodiment, the initial size "p" of the retrieving area 12 is selected in view of the maximum size of the human face portion which can be included in the input image 11. By selecting the initial size "p" of the retrieving area 12 be ⅘ of the size of the input image 11, it is possible to prevent to missing the retrieving of the largest human face portion which can be existed in the input image 11. Since the number of the pixels of the input image 11 is 640×480 pixels, the initial value of the pixels of the retrieving area 12 becomes 512×384 pixels.

Since the downsizing ratio "r" is selected to be r=0.8 in the second embodiment, the size "p" of the retrieving area 12 will be downsized to be 410×307, 328×246, 262×197, . . . pixels. The number of the pixels are rounded to be the integer. By repeating the image retrieving with the reduction of the size of the retrieving area 12, it is possible to prevent the missing of the retrieving with no relation to the size of the retrieving image 13.

The predetermined size "P" is selected to be 1/10 of the size of the input image 11. Thus, the pixels of the predetermined size "P" becomes 64×48 pixels. This size is selected to be the minimum size in view of the case that a human face portion is existed as a part of an object in the input image 11.

The pitches of the movement of the retrieving area 12 in both direction are respectively set to be "1" as the minimum pitch of the movement. By such the selection, it is possible to execute the image retrieving with no missing. The position of the retrieving area 12 is designated by using any one of the coordinates at the four corners and the center of the rectangular.

The HQ histogram forming unit 4 shown in FIG. 21 generates the normalized color histograms with using the H and Q data of the input image with respect to each retrieving area set by the retrieving area setting unit 3. Furthermore, the HQ histogram forming unit 4 generates the normalized color histograms with using the H and Q data of retrieving image.

The HQ histogram forming unit 4 generates a color histogram with a predetermined resolution of gradation "N". As shown in FIGS. 4A and 4B showing the examples of the color histograms respectively having the resolution of gradation N=16 and N=256, it is found that the image retrieving can be made faster owing to the shortening of the calculation time by reducing the resolution of gradation "N". In the second embodiment, the resolution of gradation "N" is selected to be 256 (N=256) corresponding to the highest resolution of image retrieving apparatus 10.

The HQ histogram forming unit 4 further judges whether the number of pixels of the retrieving area 12 and the retrieving image 13 is smaller than a predetermined value "D" or not. When the number of pixels is smaller than the predetermined value "D", the HQ histogram forming unit 4 generates a smoothed color histogram in which the degrees of the histogram are smoothed. In the second embodiment, the predetermined value "D" is selected to be 256 corresponding to the highest resolution of image retrieving apparatus 10.

The smoothening process of the degree is described with reference to FIGS. 23A to 23D. In the smoothing process, the interpolation is executed at two steps. At first, the interpolation of the degree is executed with respect to a gradation having a positive value of the degree but extremely smaller than the degrees of the neighboring gradations. Subsequently, the interpolation of the degree is executed with respect to a gradation having the value zero of the degree.

Figure 23A:
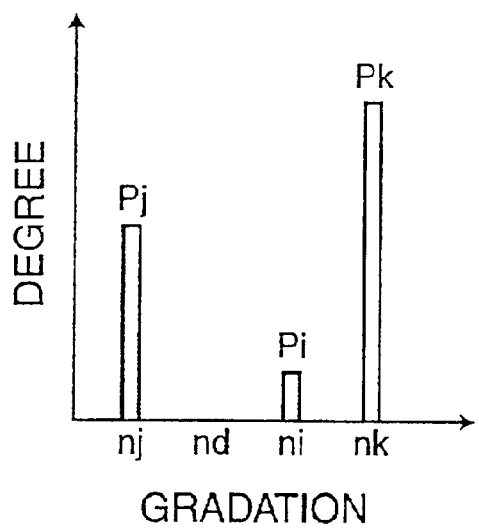
FIGS. 23A to 23D are graphs for showing smoothing process of a color histogram in the second embodiment.
Figure 23B:
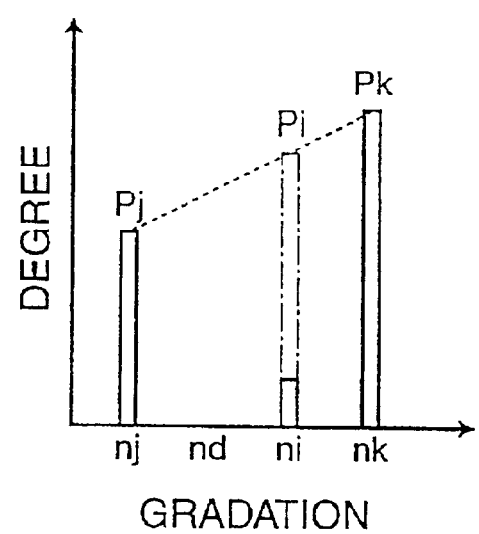

As shown in FIGS. 23A and 23B, with respect to a predetermined gradation "ni" having a positive value "Pi" of degree, other gradations "nk" and "nj" respectively having positive values "Pk" and "Pj" of degrees are considered in the higher gradation side and the lower gradation side. The smaller one of the values "Pk" and "Pj" is selected to be the minimum degree $P_{min}$. When a ratio of the value "Pi" of the gradation "ni" with respect to the minimum degree $P_{min}$ is smaller than a predetermined ration, for example, $Pi \leq P_{min}/3$, it is judged that the value "Pi" of degree of the gradation "ni" is extremely smaller than the values "Pk" and "Pj" of the neighboring gradations "nk" and "nj". Thus, the value "Pi" of degree of the gradation "ni" is converted by the following equation (3).

$$Pi=Pj+(Pk-Pj)\cdot(ni-nj)/(nk-nj) \qquad (3)$$

By such the converting process, the value "Pi" of degree of the gradation "ni" will be changed to be a value shown by dotted line in FIG. 23B from the original value shown by solid line in FIG. 23A. The value "Pi" after the conversion corresponds to a linearly interpolated value of the values "Pk" and "Pj".

Figure 23C:
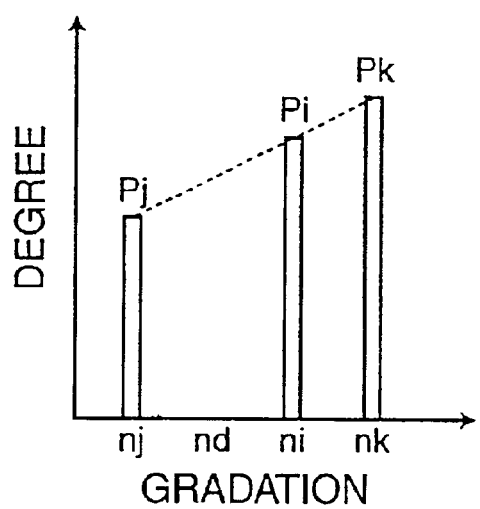
Figure 23D:
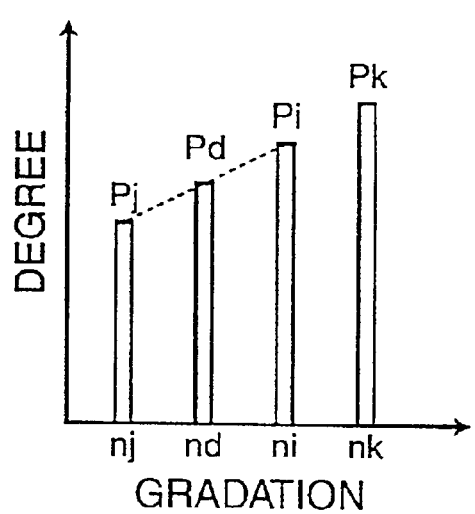

Subsequently, as shown in FIGS. 23C and 23D, with respect to a predetermined gradation "nd" having a value zero of degree, other gradations "ni" and "nj" respectively having positive values "Pi" and "Pj" of degrees are considered in the higher gradation side and the lower gradation side. The value "Pd" of degree of the gradation "nd" is converted by the following equation (4).

$$Pd=Pj+(Pi-Pj)\cdot(nd-nj)/(ni-nj) \qquad (4)$$

By such the converting process, the value "Pd" of degree of the gradation "nd" will be changed to be a value shown by dotted line in FIG. 23D from the original value zero shown in FIG. 23A. The value "Pd" after the conversion corresponds to a linearly interpolated value of the values "Pi" and "Pj".

The HQ histogram forming unit 4 further executes the normalization of the color histograms. The normalized color histogram is the color histogram normalized that the sum of the degrees is to be "1" by dividing the number of pixels with respect to each gradation by the total number of the pixels in the retrieving area.

The HQ histogram comparator 5 show in FIG. 21 compares the color histogram of the retrieving area 12 of the input image 11 with the color histogram of the retrieving image 13. The similarity judging unit 6 calculates the similarity "Sm" between the compared color histograms and judges whether the similarity "Sm" is higher than a predetermined level "S" or not. A retrieving area 12 having the similarity "Sm" larger than the predetermined level "S" is judged as the area in which the retrieving image 13 is included. The predetermined level "S" can be selected to be a suitable value corresponding to the desired image retrieving accuracy. In the second embodiment, the predetermined level "S" is selected to be 0.8 (S=0.8). The value of the similarity "S" can be obtained by the same manner shown in FIGS. 5A to 5C in the first embodiment.

Figure 22E:
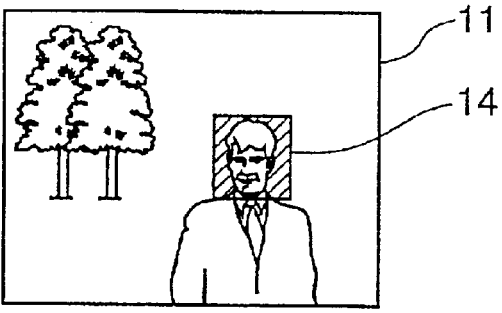

The area position memory 7 in FIG. 21 memorizes positions of the retrieving areas 12 which have the similarities "Sm" larger than the predetermined level "S" as an area 14 in which the retrieving image 13 is included (see FIG. 22E). The similar area information output unit 8 outputs the area 14 including the retrieving image 13 memorized in the area position memory 7 as a result of the image retrieving.

Figure 24:
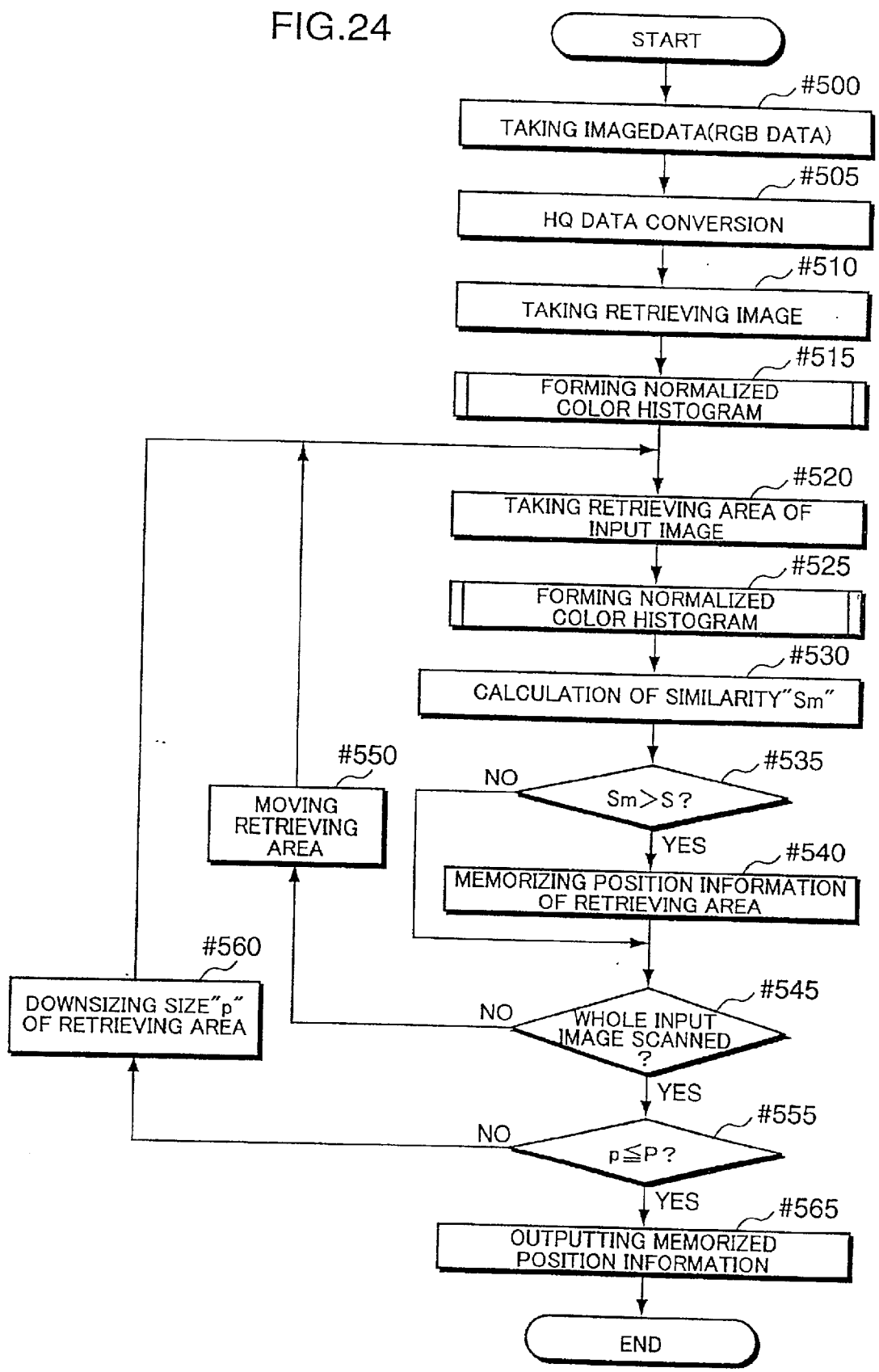
FIG. 24 is a flowchart for showing a main routine of image retrieving steps in the second embodiment.

Subsequently, steps of the image retrieving in the image retrieving apparatus in accordance with the second embodiment is described with reference to FIG. 24. FIG. 24 is a flowchart showing a main routine of the image retrieving steps.

Figure 25:
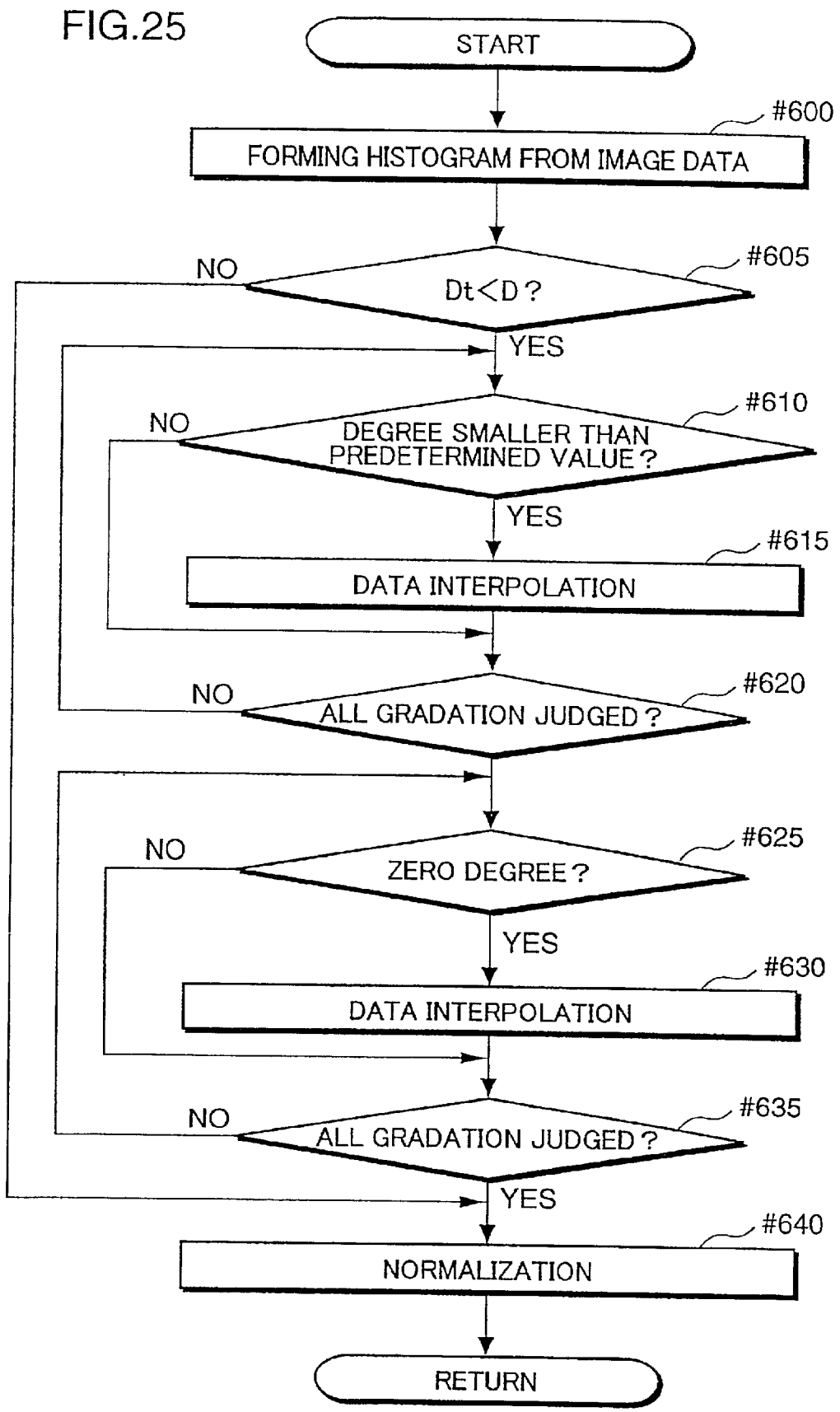
FIG. 25 is a flowchart for showing a subroutine for forming a normalized color histogram in steps #515 and #525 in the main routine shown in FIG. 24.

In the step #500, the input image 11 and the retrieving image 13 to be retrieved are taken as the image data based on the R, G and B signals (see FIGS. 22A and 22B). Subsequently, the image data based on the R, G and B signals are converted to other image data based on the H and Q data (#505). The H and Q data of the retrieving image 13 is taken (#510), and the normalized color histogram of the retrieving image 13 is formed (#515). Details of the forming of the normalized color histogram will be described below with reference to FIG. 25 showing a subroutine flow.

Subsequently, the H and Q data of the retrieving area 12 in the input image 11 (see FIG. 22C) is taken (#520), and the normalized color histogram of the retrieving area 12 is formed (#525).

A similarity "Sm" between the normalized color histograms is calculated (#530), and the similarity "Sm" is compared with the predetermined level "S" (#535). When the similarity "Sm" is larger than the predetermined level "S" (Sm>S: YES in the step #535), the position information with respect to the retrieving area 12 is memorized in the area position memory 7 (#540).

When the similarity "Sm" is equal to or smaller than the predetermined level "S" (Sm≦S: NO in the step #535) or when the position information is memorized in the step #540, it is judged whether the movement of the retrieving area 12 is scanned whole the input image 11 or not (#545). When the whole of the input image 11 has not been scanned (NO in the step #545), the retrieving area 12 is moved by the predetermined pitch in the vertical or horizontal direction (#550) and returns to the step #520.

When the whole of the input image 11 has been scanned (YES in the step #545), the size "p" of the retrieving area 12 is compared with the predetermined size "P" (#555). When the size "p" of the retrieving area 12 is larger than the predetermined size "P" (p>P :NO in the step #555), the size "p" of the retrieving area 12 is downsized by the downsizing ratio "r" as shown in FIG. 22D (#560), and returns to the step #520. Alternatively, when the size "p" of the retrieving area 12 is equal to or smaller than the predetermined size "P" (p≦P :YES in the step #555), the position information of the retrieving area 12 memorized in the area position memory 7 is outputted as the position information of the area 14 in which the retrieving image 13 is included as shown in FIG. 22E (#565), and this subroutine flow is completed.

In FIG. 25 showing the subroutine for forming the normalized color histogram in the steps #515 and #525, the color histogram is formed with the predetermined resolution of gradation "N" (N=256 in the second embodiment) from the H and Q data of the retrieving image 13 or the retrieving area 12 of the input image 11 (#600). Subsequently, the total number "Dt" of pixels of the image data is judged whether it is smaller than a predetermined value "D" or not (#605).

When the total number "Dt" is smaller than the predetermined value "D" (YES in the step #605), the degrees of the gradations in the color histogram formed in the step #600 are judged whether the degree with respect to each gradation is a positive value but equal to or smaller than a predetermined value or not (#610). In the second embodiment, the predetermined value is $P_{min}/3$ when a smaller value of degrees of the neighboring gradations in the high gradation side and the low gradation side is selected as the minimum value $P_{min}$.

When the degree with respect to the gradation is the positive value but equal to or smaller than the predetermined value (YES in the step #610), the interpolation of the data is executed by following the above-mentioned equation (3) (#615). When the degree with respect to the gradation is not the positive value and larger than the predetermined value (NO in the step #610) or when the interpolation of the data is completed in the step #615, it is judged whether the judgment of the degrees with respect to all the gradations has been completed or not (#620). When the judgment has not been completed, it will return to the step #610, and the above-mentioned steps be repeated.

When the judgment of the degrees with respect to all the gradation has been completed (YES in the step #620), the degree with respect to each gradation of the color histogram is judged whether the value of the degree is zero or not (#625). When the value of the degree is zero (YES in the step #625), the interpolation of the data is executed by following the above-mentioned equation (4) (#630). When the value of the degree is not zero (NO in the step #625) or when the data is interpolated in the step #630, it is judged whether the judgment of the degrees with respect to all the gradations has been completed or not (#635). When the judgment has not been completed, it will return to the step #625, and the above-mentioned steps be repeated.

When the total number "Dt" is equal to or larger than the predetermined value "D" (NO in the step #605) or when the judgment of the degrees with respect to all the gradation has been completed (YES in the step #635), the color histogram is normalized (#640), and this subroutine flow will be completed.

In the second embodiment, the input image 11 has 640×480 pixels, and the retrieving image 13 has 15×15=225 pixels, so that the total number 225 of pixels of the retrieving image 13 is smaller than the predetermined value D=256. Thus, the smoothed color histogram of the retrieving image 13 can be formed.

As mentioned above, the total number of pixels of the image data is judged whether it is equal to or smaller than the predetermined value "D" or not and the smoothing process is executed to the color histogram of the image data when the total number of pixels is equal to or smaller than the predetermined value "D". Thus, it is possible to prevent the color histogram of the image data be the comb shape. Furthermore, it is possible to prevent the large reduction of the similarity between the histograms due to a minute discrepancy of the gradation when the histograms have comb shapes. Still furthermore, it is possible to prevent the reduction of the image retrieving performance when the number of pixels of the input data becomes much larger.

In the smoothing process, the interpolation of the vale of the degree is executed with respect to the value of the degree when it is a positive value but extremely smaller than other values of the degrees of the neighboring gradations. Subsequently, the interpolation of the value of the degree is executed with respect to the gradation having the value of the degree is zero. Thus, the histogram having a smoothed shape can surely be formed, so that it is possible to prevent that the histogram has a comb shape.

A modification of the image retrieving apparatus in accordance with the second embodiment will be described. The electrical block diagram of the modified image retrieving apparatus is substantially the same as that shown in FIG. 21. The smoothing process by the HQ histogram forming unit 4 is different.

In this modification, the HQ histogram forming unit 4 executes the smoothing process by roughing the resolution of gradation "N" when the number of pixels of the retrieving area 12 of the input image 11 or the retrieving image 13 is equal to or smaller than the predetermined value "D".

The HQ histogram forming unit 4 compares a number of pixels "Dn" of the retrieving area 12 with a number of pixels "Dk" of the retrieving image 13. The HQ histogram forming unit 4 further compares the smaller value "K" of the numbers "Dn" and "Dk" with the predetermined value "D". When K<D, it selects the resolution of gradation N=K/5 which will be used for forming a color histogram.

Figure 26:
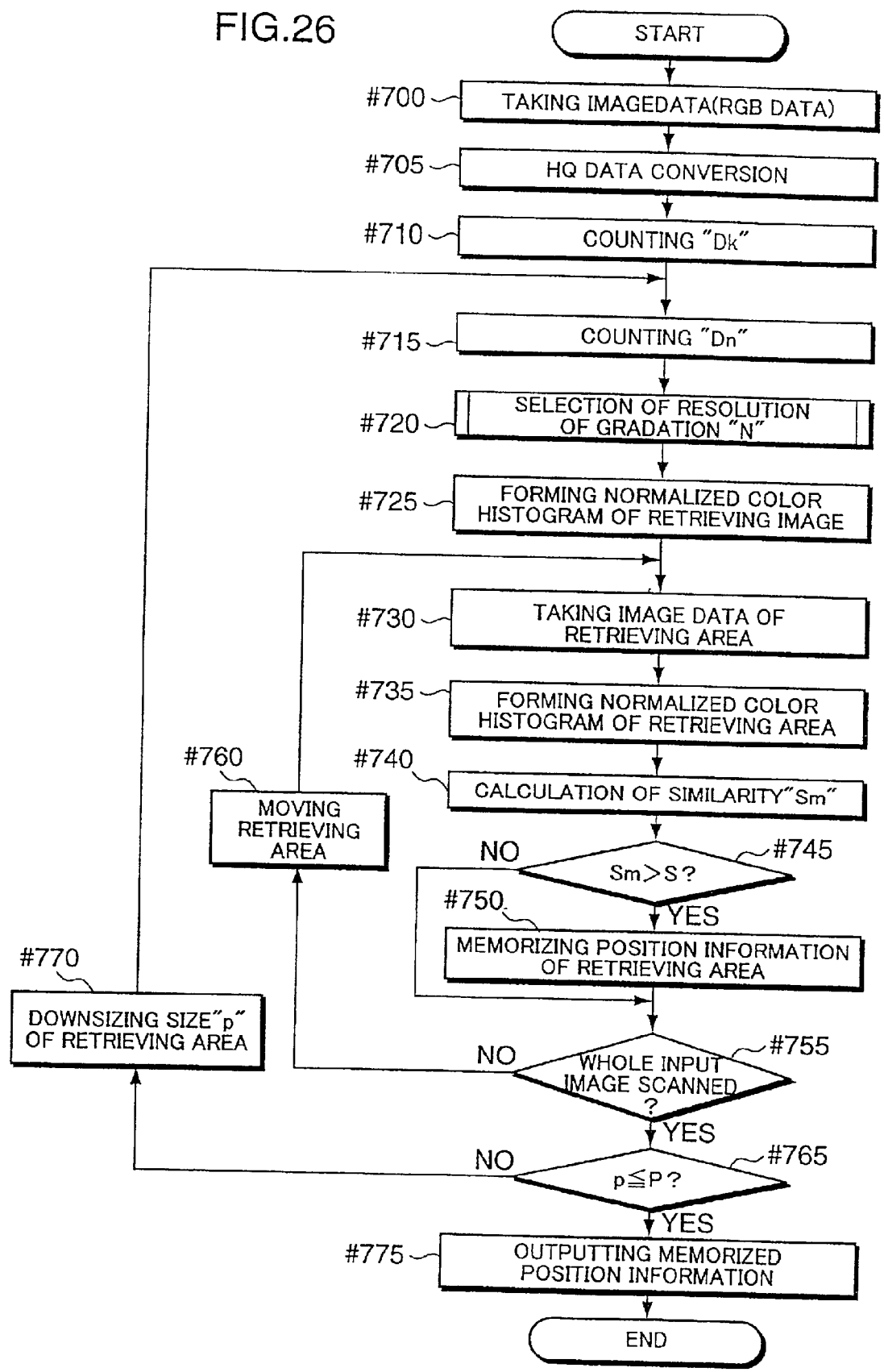
FIG. 26 is a flowchart for showing a main routine of image retrieving steps in a modification of the second embodiment.

Steps of the image retrieving in the modified image retrieving apparatus in accordance with the second embodiment is described with reference to FIG. 26. FIG. 26 is a flowchart showing a main routine of the image retrieving steps.

In the step #700, the input image 11 and the retrieving image 13 to be retrieved are taken as the image data based on the R, G and B signals (see FIGS. 22A and 22B). Subsequently, the image data based on the R, G and B signals are converted to other image data based on the H and Q data (#705).

The H and Q data of the retrieving image 13 is taken, and the number of pixels "Dk" is counted (#710). The number of pixels "Dk" in this modification is 15×15=255. Similarly, the H and Q data of the retrieving area 12 is taken, and the number of pixels "Dn" is counted (#715). Since the initial value of the size of the retrieving area 12 is ⅘ of the size of the input image 11, the initial value of the number of pixels "Dn" of the retrieving area 12 becomes 512×384=196608.

Figure 27:
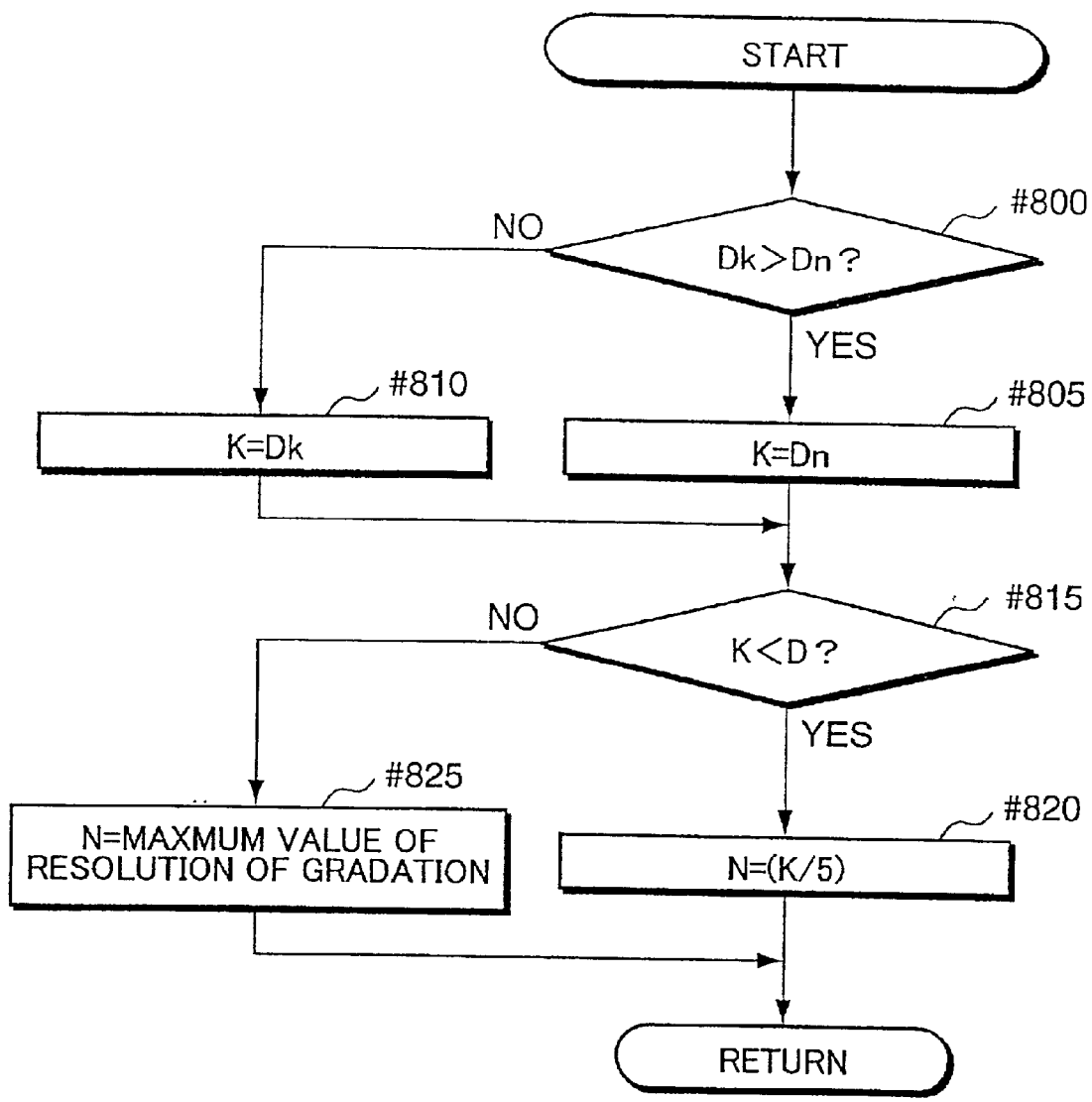
FIG. 27 is a flowchart for showing a subroutine for selecting resolution of gradation "N" in steps #720 in the main routine shown in FIG. 26.

Subsequently, the resolution of gradation "N" which will be used for forming the color histograms of the retrieving area 12 and the retrieving image 13 is selected (#720). Details of the selection of the resolution of gradation "N" will be described below with reference to FIG. 27 showing a subroutine flow. The normalized color histogram of the retrieving image 13 is formed with using the resolution of gradation "N" (#725).

Subsequently, the image data of the retrieving area 12 in the input image 11 (see FIG. 22C) is taken (#730), and the normalized color histogram of the retrieving area 12 is formed (#735).

A similarity "Sm" between the normalized color histograms is calculated (#740), and the similarity "Sm" is compared with the predetermined level "S" (#745). When the similarity "Sm" is larger than the predetermined level "S" (Sm>S: YES in the step #745), the position information with respect to the retrieving area 12 is memorized in the area position memory 7 (#750).

When the similarity "Sm" is equal to or smaller than the predetermined level "S" (Sm≦S: NO in the step #745) or when the position information is memorized in the step #750, it is judged whether the movement of the retrieving area 12 is scanned whole the input image 11 or not (#755). When the whole of the input image 11 has not been scanned (NO in the step #755), the retrieving area 12 is moved by the predetermined pitch in the vertical or horizontal direction (#760) and returns to the step #730.

When the whole of the input image 11 has been scanned (YES in the step #755), the size "p" of the retrieving area 12 is compared with the predetermined size "P" (#765). When the size "p" of the retrieving area 12 is larger than the predetermined size "P" (p>P :NO in the step #765), the size "p" of the retrieving area 12 is downsized by the downsizing ratio "r" as shown in FIG. 22D (#770), and returns to the step #715 so as to be counted the number of pixels "Dn" with respect to the downsized size of the retrieving area 12. Alternatively, when the size "p" of the retrieving area 12 is equal to or smaller than the predetermined size "P" (p≦P :YES in the step #765), the position information of the retrieving area 12 memorized in the area position memory 7 is outputted as the position information of the area 14 in which the retrieving image 13 is included as shown in FIG. 22E (#775), and this subroutine flow is completed.

In FIG. 27 showing the subroutine for selecting the resolution of gradation "N" in the steps #720, the number of pixels "Dk" of the retrieving image 13 is compared with the number of gradation "Dn" of the retrieving area 12 (#800), and the smaller value of "Dk" and "Dn" is selected as the number of pixels "K" (#805 and #810).

Subsequently, the number of pixels "K" is compared with the predetermined value "D" (#815). When the number of pixels "K" is smaller than the predetermined value "D" (K<D) (YES in the step #815), the value of the resolution of gradation "N" is selected to be K/5 (N=K/5) (#820). When the number of pixels "K" is equal to or larger than the predetermined value "D" (K≧D) (NO in the step #815), the value of the resolution of gradation "N" is selected to be the maximum value of the resolution of gradation, for example 256 (#825).

In this modification, when the number of pixels Dk=15×15=255 and the size "p" of the retrieving area 12 takes the initial value, the number of pixels Dn=512×384=196608. Since the value "Dk" is smaller than the value "Dn" (Dk<Dn), the number of pixels "K" is selected to take the value "Dk" (K=Dk). Hereupon, there is a relation that K=225<D=256, so that the number of the resolution of gradation "N" becomes 45 (N=225/5=45). The color histograms are formed with the resolution of gradation N=45.

In this modification, when the smaller number of pixels "k" of the number of pixels "Dn" of the retrieving area 12 and the number of pixels "Dk" of the retrieving image 13 is equal to or smaller than the predetermined value "D", the resolution of gradation "N" is elected to be smaller such as N=K/5 used for forming the color histograms in the smoothing process of the degrees. Thus, it is possible to prevent that the shape of the histogram becomes comb shape, and to prevent the reduction of the image retrieving performance.

Furthermore, the color histograms are formed by roughing the resolution of gradation in the smoothing process of the degrees, so that the burden in the calculation can be reduced and the time for retrieving the image can be shortened.

Hereupon, a width "n" of a gradation of the color histogram can be obtained by the following equation.

$n$=(maximum resolution of gradation)/$N$

Furthermore, when it is supposed to occur the luminance variation or color fogging on the image of the object, it is preferable to increase the width "n" of the gradation for reducing the affect of the variation of the luminance or the color fogging. For example, the width "n" of the gradation should be n=n+0.3 with respect to the hue (H) data, and the width "n" of the gradation should be n=n+30 with respect to the compensates saturation (Q) data. The increased width +0.3 or +30 can be decided by basing on the variation of the hue (H) or the compensated saturation (Q) caused by the color fogging or the under exposure on the image taken by, for example, the digital still camera.

Another modification of the smoothing process of the degrees in the forming of the color histogram by the HQ histogram forming unit 4 is described below with reference to FIGS. 28A to 28E.

Figure 28A:
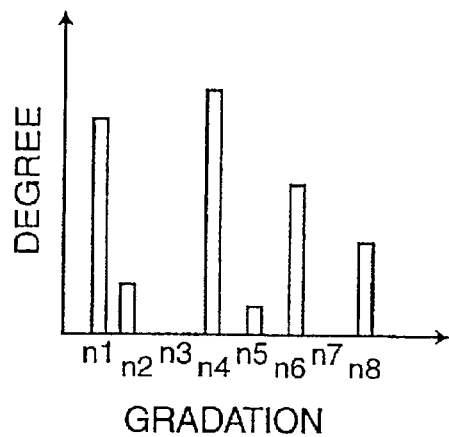
FIGS. 28A to 28E are graphs for showing smoothing process of a color histogram in another modification of the second embodiment.

FIG. 28A shows a basic color histogram having a comb shape due to the number of pixels is smaller. The numbers of the degrees with respect to the gradations "n2" and "n5" are extremely smaller than the numbers of degrees of the neighboring gradations. The values of the degrees with respect to the gradations "n3" and "n7" are zero.

Figure 28B:
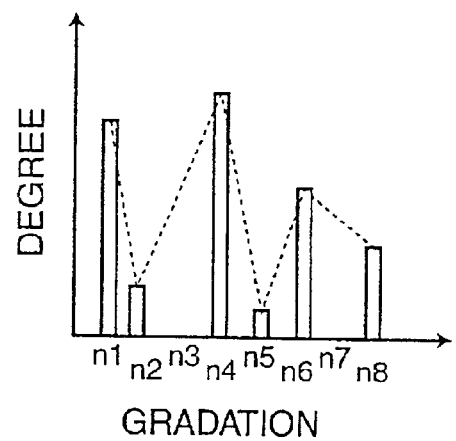

FIG. 28B shows an example of an interpolated color histogram. The positive values of the degrees in the same histogram as shown in FIG. 28A are serially bounded by dotted lines. This example, however, is not preferable because the color histogram becomes a comb shape in the vicinity of the gradations "n2" and "n5" respectively having the extremely smaller values of the degrees.

Figure 28C:
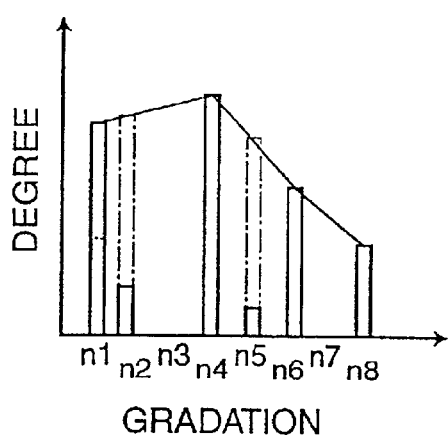

FIG. 28C shows another example of an interpolated color histogram. The positive values of the degrees except the extremely smaller values corresponding to the gradations "n2" and "n5" in the same histogram as shown in FIG. 28A are serially bounded by solid lines. The value of the degree with respect to the gradation "n2" is interpolated to be a value on the solid line bounding the values of degrees with respect to the gradations "n1" and "n4" by following the above-mentioned equations (3) and (4). Similarly, the value of the degree with respect to the gradation "n5" is interpolated to be a value on the solid line bounding the values of degrees with respect to the gradations "n4" and "n6". In this example, the upper and lower limits of the gradation are linearly interpolated so that the predetermined minimum gradation such as zero and the predetermined maximum gradation such as "255" becomes zero. Alternatively, it is possible to select the upper and lower limits of the gradation in a manner so that the gradation decided by basing on a difference between two gradations respectively taking positive values of the degrees on the higher limit side and the lower limit side should be zero.

Figure 28D:
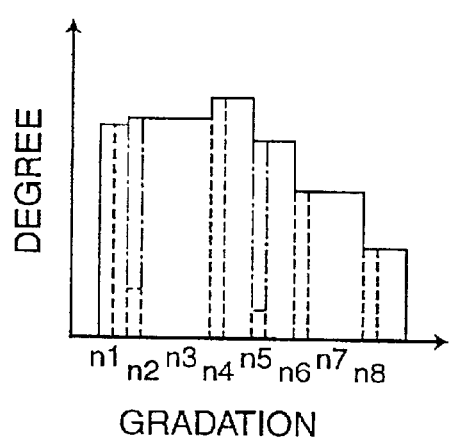

FIG. 28D shows still another example of an interpolated color histogram. The values of the degree with respect to the gradations "n2" and "n5" are interpolated by substantially the same manner in the example shown in FIG. 28C. The values of degree with respect to the gradations "n3" and "n7" are interpolated to take the same value as the smaller one of the values with respect to adjoining gradations. By such the interpolation, the color histogram can be formed with a relatively rough resolution of gradation corresponding to the number of the gradations having the positive values of degree.

Figure 28E:
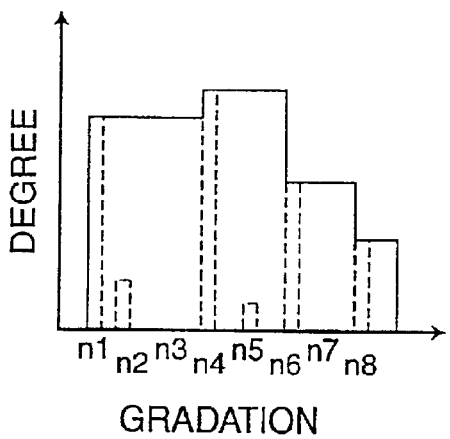

FIG. 28E shows still another example of an interpolated color histogram. The values of the degree with respect to the gradations "n2" and "n5" which are extremely smaller and the values of degree with respect to the gradations "n3" and "n7" taking the value zero are interpolated to take the same value as the smaller one of the values with respect to adjoining gradations. In this case the values of the degree with respect to the gradations "n2" and "n5" are regarded as zero. By such the interpolation, the color histogram can be formed with a rough resolution of gradation corresponding to the number of the gradations having the positive values of degree except the gradations having extremely smaller values and zero.

By using the smoothing process shown in FIG. 28C or 28D, it is possible to prevent that the histogram have a comb shape even when the number of pixels of the image data is smaller. Furthermore, when the smoothing process shown in FIG. 28E is used, the accuracy of the image retrieving is reduced than that in the case using the smoothing process shown in FIG. 28D, but it is possible to prevent that the color histogram has a comb shape. Especially, when the smoothing process shown in FIG. 28D or 28E is used, the burden of the calculation can be reduced largely than the case using other smoothing process, so that the time of the image retrieving can be shortened.

When the gradation having the extremely smaller value of degree such as the gradation "n2" or "n5" in FIG. 28A is not existed in the histogram, it is possible to interpolate the values of degree by using the values on the lined bounding the positive peak values of degree. By such the interpolation, the histogram may not have a comb shape.

In the above-mentioned second embodiment, the hue (H) and the compensated saturation (Q) are used as the color space. It, however, is possible to use the R, G and B signals. Furthermore, it is possible to use another color system such as the HIS (Hue, Intensity, Saturation) color system, the L*a*b* color system, or the L*u*v* color system.

It is possible further to provide an operating unit 91 illustrated by dotted line in FIG. 21 showing the configuration of the image retrieving apparatus in accordance with the second embodiment. By such a modification, it is possible to input the values of the parameters such as the value of the resolution of gradation "N", the size "p" of the retrieving area 12, the values of the pitches of the retrieving area 12, the values of the predetermined level "S", and so on by using the operating unit 91.

In the above-mentioned second embodiment, the retrieving image 13 is taken by the image input unit 1. It, however, is possible further to provide an retrieving data memory 92 illustrated by dotted line in FIG. 21. The data with respect to the retrieving image 13 is previously memorized in the retrieving data memory 92. In this modification, it is possible to memorize the R, G and B signals as the data of the retrieving image 13. Alternatively, it is possible to memorize the H and Q data converted from the R, G and B signals as the data of the retrieving image 13.

Furthermore, it is possible to memorize the normalized color histogram based on the H and Q data as the data of the retrieving image 13 in the retrieving data memory 92. In this case, it is further possible to memorize the normalized color histograms which are formed with the resolution of gradation "N".

A digital still camera using the image retrieving apparatus in accordance with the second embodiment is described. The digital still camera 100 has substantially the same configuration as shown in FIG. 16. The image retrieving apparatus 10 in the digital still camera 100 corresponds to that shown in FIG. 21.

Table 2 shows the degree for the edge emphasizing operation and the gradation characteristic (γ) with respect to each region of the size of the human face portion. Filters used in the edge emphasizing operation are the same as them shown in FIGS. 18A to 18C.

TABLE 2

| RATIO OF HUMAN FACE PORTION | DEGREE OF EDGE EMPHASIZING | GRADATION CHARACTERISTIC |
|---|---|---|
| LARGE (30 to 100%) | WEAK | γ = 1.1 (a in FIG. 29) |
| MIDDLE (10 to 30%) | MIDDLE | γ = 1.15 (b in FIG. 29) |
| SMALL (5 to 10%) | MIDDLE | γ = 1.2 (c in FIG. 29) |
| NOT RETRIEVED | STRONG | γ = 1.25 (d in FIG. 29) |

As can be seen from table 2, when the ratio of the size of the retrieving area including the human face portion with respect to the size of the input image is in the range from 30 to 100%, the filter shown in FIG. 18C having the low degree for edge emphasizing effect is used for emphasizing the edge of the retrieving area including the human face portion. When the ratio of the size of the retrieving area including the human face portion with respect to the size of the input image is in the range from 5 to 30%, the filter shown in FIG. 18B having the middle degree for edge emphasizing effect is used for emphasizing the edge of the retrieving area. On the other hand, when the human face portion is not retrieved in the input image, the filter shown in FIG. 18A having the high degree for edge emphasizing effect is used for emphasizing the edge of the retrieving area.

Figure 29:
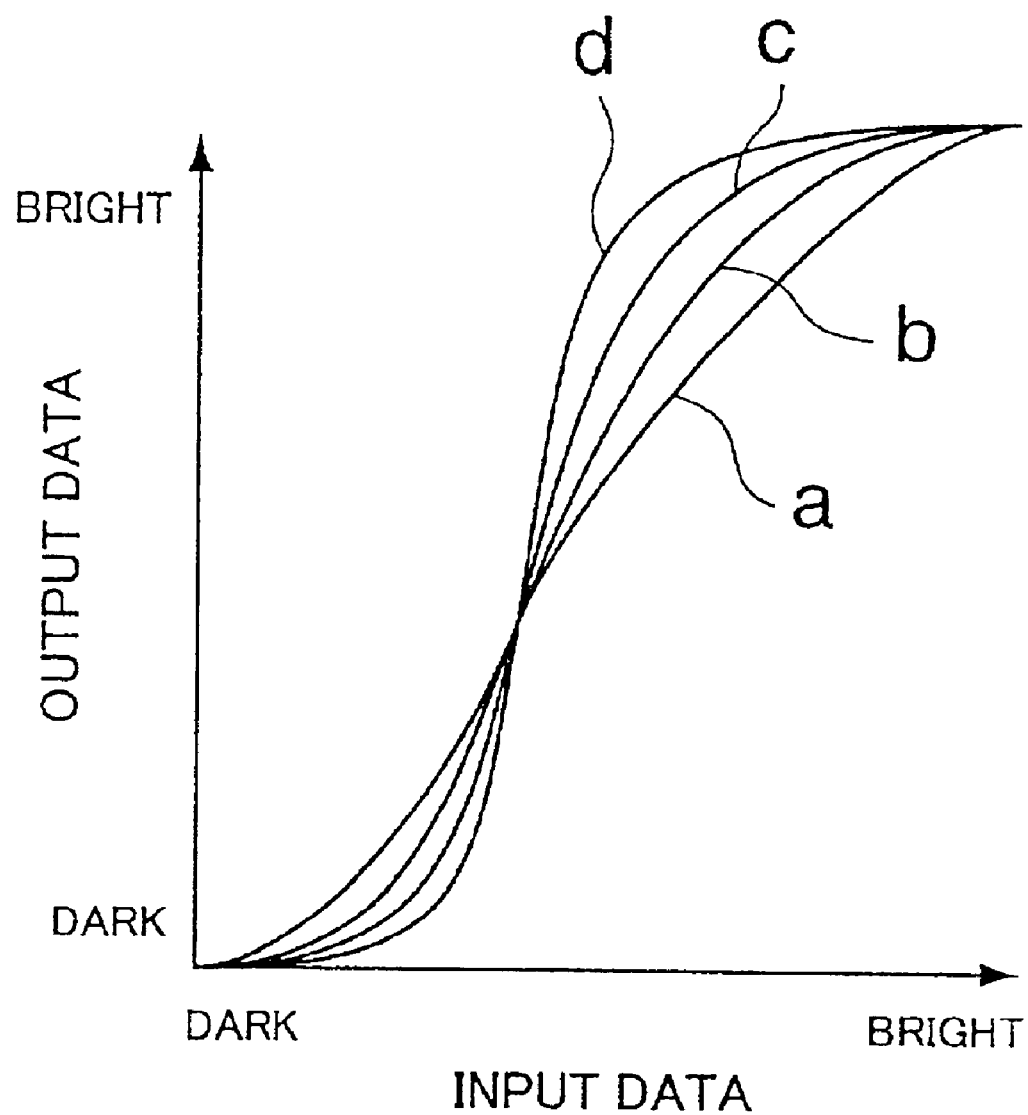
FIG. 29 is a graph for showing examples of gradation characteristics (γ characteristic curves) used in gradation compensation process in the digital still camera in accordance with the second embodiment.
Figure 30A:
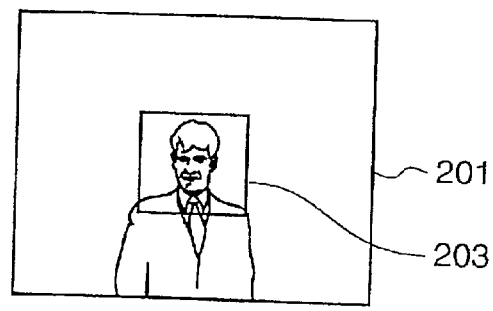
FIG. 30A is the drawing for showing the relation between the input image and the retrieving area moving in the input image in the conventional image retrieving method.
Figure 30B:
FIG. 30B is the drawing for showing the retrieving image to be retrieved in the conventional image retrieving method.
Figure 30C:
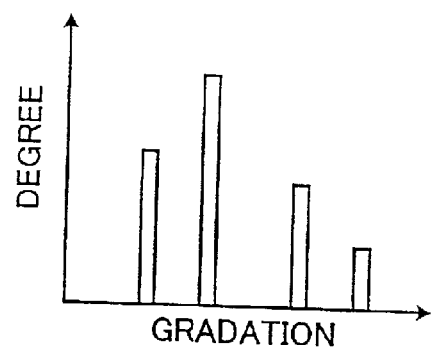
FIGS. 30C to 30E are the graphs for showing the problem in the conventional method for calculating the similarity between the color histograms.
Figure 30D:
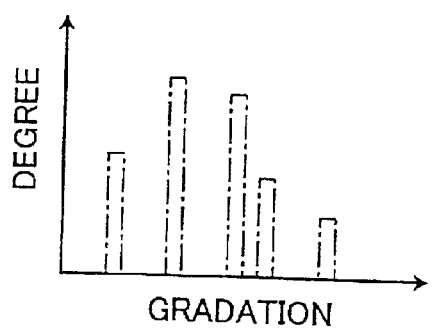
Figure 30E:
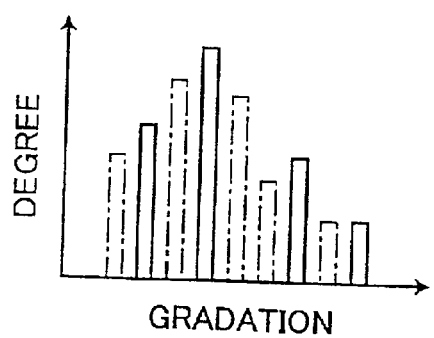

FIG. 29 shows examples of the gradation characteristics (γ characteristic curves) used in the gradation compensation process by the image processing unit 105. The gradation compensation process is executed corresponding to the size of the retrieving area after a compensation for reversing the input/output characteristics of a monitor.

As can be seen from table 2, when the ratio of the size of the retrieving area including the human face portion with respect to the size of the input image is in the range from 30 to 100%, the γ characteristic curve "a" (γ=1.1) shown in FIG. 29 is used for compensating the gradation. When the ratio of the size of the retrieving area including the human face portion with respect to the size of the input image is in the range from 10 to 30%, the γ characteristic curve "b" (γ=1.15) shown in FIG. 29 is used for compensating the gradation. When the ratio of the size of the retrieving area including the human face portion with respect to the size of the input image is in the range from 5 to 10%, the γ characteristic curve "c" (γ=1.2) shown in FIG. 29 is used for compensating the gradation. On the other hand, when the human face portion is not retrieved in the input image, the γ characteristic curve "d" (γ=1.25) shown in FIG. 29 is used for compensating the gradation.

A boundary, for example, 30% of the regions of the ratio of the size of the retrieving area with respect to the size of the input image are to be included in one of the adjoining two regions. The boundaries are not restricted by the examples shown in table 2. It is possible to select proper values corresponding to the characteristic of the digital still camera 100.

The above-mentioned modification is described with respect to the digital still camera. The image retrieving apparatus 10 in accordance with the second embodiment can be applied to another imaging apparatus such as a digital video camera for recording a movie.

Still furthermore, it is possible to apply the image retrieving apparatus 10 to a printer. A block diagram for showing an example of an electric configuration of the printer using the image retrieving apparatus 10 in accordance with the second embodiment is substantially the same as that in the first embodiment shown in FIG. 20. The explanation of the printer is omitted.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

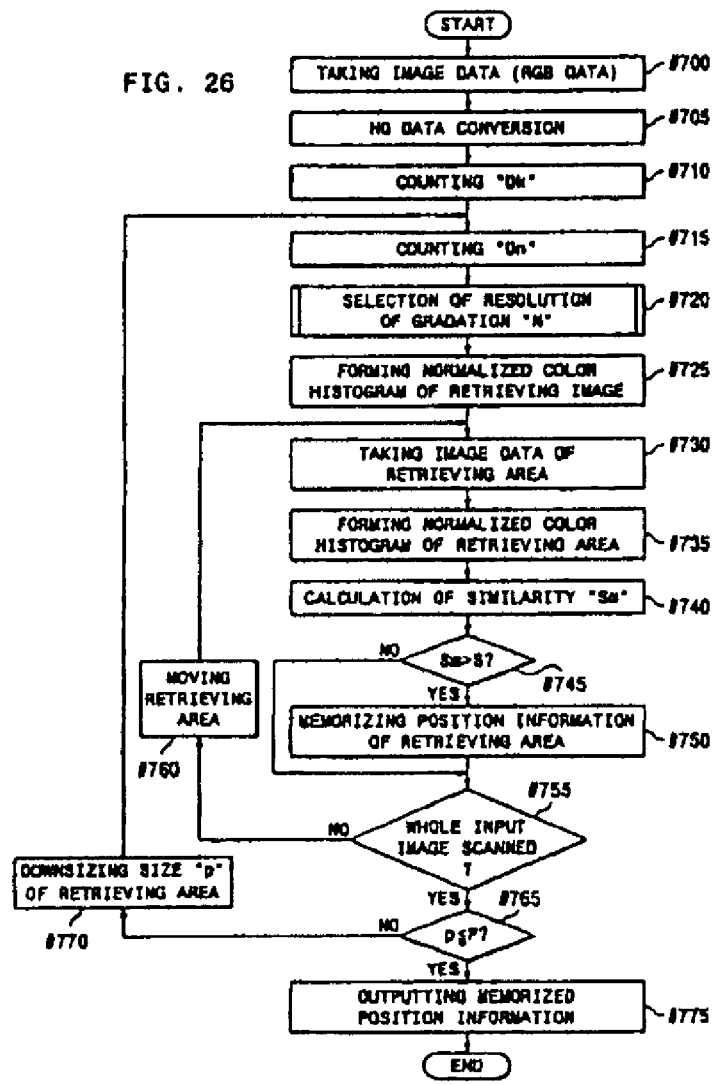

What is claimed is:

1. An image retrieving apparatus for retrieving whether an image similar to a predetermined retrieving image to be retrieved is included in an input image or not comprising:
    a first area extracting unit for extracting a first retrieving area having a first size from the input image with respect to each movement at a first moving pitch;
    a first histogram forming unit for forming a first histogram with respect to each first retrieving area with a first resolution of gradation;
    a second histogram forming unit for forming a second histogram of the retrieving image with the first resolution of gradation;
    a second area extracting unit for comparing the first histogram with the second histogram for calculating a similarity of the first histogram with respect to the second histogram and for extracting a retrieving area having the similarity larger than a first level;
    a third area extracting unit for extracting a second retrieving area having a second size from the first retrieving area extracted by the second area extracting unit at a second moving pitch;
    a third histogram forming unit for forming a third histogram with respect to each second retrieving area with a second resolution of gradation which is higher than the first resolution of gradation;
    a fourth histogram forming unit for forming a fourth histogram of the retrieving image with the second resolution of gradation; and
    an area retrieving unit for comparing the third histogram with the fourth histogram for calculating a similarity of the third histogram with respect to the fourth histogram and for retrieving an area having the similarity larger than a second level.

2. The image retrieving apparatus in accordance with claim 1 further comprising a memory for memorizing at least the second histogram and the fourth histogram which are previously formed by the second histogram forming unit and the fourth histogram forming unit.

3. The image retrieving apparatus in accordance with claim 1 further comprising a memory for memorizing at least the fourth histogram which is previously formed by the fourth histogram forming unit, and wherein the second histogram forming unit forms the second histogram from the fourth histogram memorized in the memory.

4. The image retrieving apparatus in accordance with claim 1, wherein the first moving pitch is larger than the second moving pitch.

5. The image retrieving apparatus in accordance with claim 1, wherein the first level used in the second area extracting unit is lower than the second level used in the area retrieving unit.

6. The image retrieving apparatus in accordance with claim 1, wherein the second size is smaller than the first size.

7. The image retrieving apparatus in accordance with claim 1, wherein the retrieving image includes a human face portion.

8. The image retrieving apparatus in accordance with claim 1, wherein the image retrieving apparatus is a digital still camera further comprising an imaging sensor for forming the input image and an imaging controller for controlling an imaging process corresponding to a result of area retrieving by the area retrieving unit.

9. The image retrieving apparatus in accordance with claim 8, wherein the imaging controller controls an optical system for focusing the area retrieved by the area retrieving unit.

10. The image retrieving apparatus in accordance with claim 8, wherein the imaging controller controls an aperture value of an optical system and an exposing time for exposing the imaging sensor so as to be exposed the area retrieved by the area retrieving unit with a proper exposing quantity.

11. The image retrieving apparatus in accordance with claim 8, wherein the imaging controller adjusts color data with respect to the area retrieved by the area retrieving unit.

12. The image retrieving apparatus in accordance with claim 8, wherein the imaging controller executes an edging process to an image data with respect to the area retrieved by the area retrieving unit.

13. The image retrieving apparatus in accordance with claim 8, wherein the imaging controller executes a gradation compensation to an image data with respect to the area retrieved by the area retrieving unit corresponding to the size of the area.

14. The image retrieving apparatus in accordance with claim 1, wherein the image retrieving apparatus is a printer comprising an imaging processor for executing imaging process to an image data with respect to the area retrieved by the area retrieving unit, and a printing unit for printing an image on a paper sheet with using the processed image data by the imaging processor.

15. The image retrieving apparatus in accordance with claim 14, wherein the imaging processor compensates output values of three principal color signals so as to make a luminance of an image with respect to the area retrieved by the area retrieving unit be a proper value.

16. The image retrieving apparatus in accordance with claim 14, wherein the imaging processor adjusts color data with respect to the area retrieved by the area retrieving unit.

17. The image retrieving apparatus in accordance with claim 14, wherein the imaging processor executes an edging process to an image data with respect to the area retrieved by the area retrieving unit.

18. The image retrieving apparatus in accordance with claim 14, wherein the imaging processor executes a gradation compensation to an image data with respect to the area retrieved by the area retrieving unit corresponding to the size of the area.

19. An image retrieving method for retrieving whether an image similar to a predetermined retrieving image to be retrieved is included in an input image or not comprising the steps of:
  a first area extracting step for extracting a first retrieving area having a first size from the input image with respect to each movement at a first moving pitch;
  a first histogram forming step for forming a first histogram with respect to each first retrieving area with a first resolution of gradation;
  a second histogram forming step for forming a second histogram of the retrieving image with the first resolution of gradation;
  a second area extracting step for comparing the first histogram with the second histogram for calculating a similarity of the first histogram with respect to the second histogram and for extracting a retrieving area having the similarity larger than a first level;
  a third area extracting step for extracting a second retrieving area having a second size from the first retrieving area extracted by the second area extracting step at a second moving pitch;
  a third histogram forming step for forming a third histogram with respect to each second retrieving area with a second resolution of gradation which is higher than the first resolution of gradation;
  a fourth histogram forming step for forming a fourth histogram of the retrieving image with the second resolution of gradation; and
  an area retrieving step for comparing the third histogram with the fourth histogram for calculating a similarity of the third histogram with respect to the fourth histogram and for retrieving an area having the similarity larger than a second level.

20. An image retrieving apparatus for retrieving whether an image similar to a predetermined retrieving image to be retrieved is included in an input image or not comprising:
  an area extracting unit for extracting a retrieving area having a predetermined size from the input image with respect to each movement at a predetermined moving pitch;
  a judging unit for judging whether a number of pixels included in the retrieving area is smaller than a predetermined value or not;
  a first histogram forming unit for forming a first histogram with respect to each retrieving area with a first resolution of gradation, and for smoothing the first histogram when the number of pixels in the retrieving area is smaller than the predetermined value;
  a second histogram forming unit for forming a smoothed second histogram of the retrieving image; and
  an area retrieving unit for calculating a similarity of the first histogram of each retrieving area with respect to the second histogram by comparing the first histogram with the second histogram, and for retrieving an area having the similarity larger than a predetermined level.

21. The image retrieving apparatus in accordance with claim 20, wherein smoothing process in the first histogram forming unit and in the second histogram forming unit varies a value of degree of a specific gradation to be another value corresponding to a smaller one of values of degree of neighboring gradations of the specific gradation in higher gradation side and lower gradation side.

22. The image retrieving apparatus in accordance with claim 21, wherein the smoothing process varies the value of degree of the specific gradation in a manner so that a quantity of discrepancy between the value of degree with respect to the specific gradation and one of the values of degree of neighboring gradations of the specific gradation in higher gradation side and lower gradation side becomes equal to or smaller than a predetermined value.

23. The image retrieving apparatus in accordance with claim 21, wherein the specific gradation is a gradation having a positive value of degree, a ratio of the value of degree of the specific gradation against a value of degree of gradation which is the nearest positive value in the lower gradation side is equal to smaller than a predetermined value.

24. The image retrieving apparatus in accordance with claim 21, wherein the smoothing process varies the value of degree of the specific gradation to a value on a straight line binding the values of degree of the neighboring gradations in the higher gradation side and the lower gradation side.

25. The image retrieving apparatus in accordance with claim 21, wherein the smoothing process further varies a value of degree of another gradation taking zero degree to another value with using positive values of degree of the nearest gradations in the higher gradation side and the lower gradation side.

26. The image retrieving apparatus in accordance with claim 25, wherein the value of degree of another gradation taking zero degree is varied to a value on a straight line binding the positive values of degree of the nearest gradations in the higher gradation side and the lower gradation side.

27. The image retrieving apparatus in accordance with claim 20, wherein the first histogram forming unit forms the smoothed histogram with a second resolution of gradation lower than the first resolution of gradation.

28. The image retrieving apparatus in accordance with claim 27, wherein the second resolution of gradation is a value of the number of pixels in the retrieving area divided by a predetermined value.

29. The image retrieving apparatus in accordance with claim 20 further comprising a memory in which the second histogram previously formed by the second histogram forming unit is memorized.

30. The image retrieving apparatus in accordance with claim 20, wherein the judging unit further judges whether a number of pixels of the retrieving image is smaller than a predetermined value, and the second histogram forming unit forms the second smoothed histogram of the retrieving image when the number of pixels is smaller than the predetermined value.

31. The image retrieving apparatus in accordance with claim 30, wherein the first histogram forming unit and the second histogram forming unit respectively form the smoothed histograms with a resolution of gradation having a value which is divided a smaller one of the value of the number of pixels of the retrieving area and the value of the number of pixels of the retrieving image by a predetermined value when at least one of the number of pixels of the retrieving area and the number of pixels of the retrieving image is smaller than the predetermined value.

32. The image retrieving apparatus in accordance with claim 20, wherein the retrieving image includes a human face portion.

33. The image retrieving apparatus in accordance with claim 20, wherein the image retrieving apparatus is a digital still camera further comprising an imaging sensor for forming the input image and an imaging controller for controlling an imaging process corresponding to a result of area retrieving by the area retrieving unit.

34. The image retrieving apparatus in accordance with claim 33, wherein the imaging controller controls an optical system for focusing the area retrieved by the area retrieving unit.

35. The image retrieving apparatus in accordance with claim 33, wherein the imaging controller controls an aperture value of an optical system and an exposing time for exposing the imaging sensor so as to be exposed the area retrieved by the area retrieving unit with a proper exposing quantity.

36. The image retrieving apparatus in accordance with claim 33, wherein the imaging controller adjusts color data with respect to the area retrieved by the area retrieving unit.

37. The image retrieving apparatus in accordance with claim 33, wherein the imaging controller executes an edging process to an image data with respect to the area retrieved by the area retrieving unit.

38. The image retrieving apparatus in accordance with claim 33, wherein the imaging controller executes a gradation compensation to an image data with respect to the area retrieved by the area retrieving unit corresponding to the size of the area.

39. The image retrieving apparatus in accordance with claim 20, wherein the image retrieving apparatus is a printer comprising an imaging processor for executing imaging process to an image data with respect to the area retrieved by the area retrieving unit, and a printing unit for printing an image on a paper sheet with using the processed image data by the imaging processor.

40. The image retrieving apparatus in accordance with claim 39, wherein the imaging processor compensates output values of three principal color signals so as to make a luminance of an image with respect to the area retrieved by the area retrieving unit be a proper value.

41. The image retrieving apparatus in accordance with claim 39, wherein the imaging processor adjusts color data with respect to the area retrieved by the area retrieving unit.

42. The image retrieving apparatus in accordance with claim 39, wherein the imaging processor executes an edging process to an image data with respect to the area retrieved by the area retrieving unit.

43. The image retrieving apparatus in accordance with claim 39, wherein the imaging processor executes a gradation compensation to an image data with respect to the area retrieved by the area retrieving unit corresponding to the size of the area.

44. An image retrieving apparatus for retrieving whether an image similar to a predetermined retrieving image to be retrieved is included in an input image or not comprising the steps of:

an area extracting step for extracting a retrieving area having a predetermined size from the input image with respect to each movement at a predetermined moving pitch;

a judging step for judging whether a number of pixels included in the retrieving area is smaller than a predetermined value or not;

a first histogram forming step for forming a first histogram with respect to each retrieving area with a first resolution of gradation, and for smoothing the first histogram when the number of pixels in the retrieving area is smaller than the predetermined value;

a second histogram forming step for forming a smoothed second histogram of the retrieving image; and an area retrieving step for calculating a similarity of the first histogram of each retrieving area with respect to the second histogram by comparing the first histogram with the second histogram, and for retrieving an area having the similarity larger than a predetermined level.

* * * * *

UNITED STATES PATENT AND TRADEMARK OFFICE
CERTIFICATE OF CORRECTION

PATENT NO. : 6,859,552 B2
APPLICATION NO. : 09/992164
DATED : February 22, 2005
INVENTOR(S) : Reiko Izume et al.

It is certified that error appears in the above-identified patent and that said Letters Patent is hereby corrected as shown below:

The title page showing the illustrative figure should be deleted to be replaced with the attached title page.

Signed and Sealed this

Seventeenth Day of June, 2008

JON W. DUDAS
*Director of the United States Patent and Trademark Office*

(12) United States Patent
Izume et al.

(10) Patent No.: US 6,859,552 B2
(45) Date of Patent: Feb. 22, 2005

(54) IMAGE RETRIEVING APPARATUS

(75) Inventors: Rieko Izume, Sakai (JP); Yoshihiro Hara, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 589 days.

(21) Appl. No.: 09/992,164

(22) Filed: Nov. 6, 2001

(65) Prior Publication Data
US 2002/0081026 A1 Jun. 27, 2002

(30) Foreign Application Priority Data
Nov. 7, 2000 (JP) .................... 2000-339306
Nov. 28, 2000 (JP) .................... 2000-361566

(51) Int. Cl.⁷ .................................. G06K 9/00
(52) U.S. Cl. ........................... 382/170; 382/305
(58) Field of Search ................... 382/169, 170, 382/195, 203, 209, 218, 305; 707/6, 104.1

(56) References Cited

U.S. PATENT DOCUMENTS 6,411,953 B1 * 6/2002 Ganapathy et al. ........... 707/6
6,711,287 B1 * 3/2004 Iwasaki ..................... 382/170

FOREIGN PATENT DOCUMENTS

| JP | 63-042406 A | 2/1988 |
| JP | 01-134573 A | 5/1989 |
| JP | 01-289696 A | 11/1989 |
| JP | 05-288520 A | 11/1993 |
| JP | 06-168331 A | 6/1994 |
| JP | 06-245064 A | 9/1994 |
| JP | 07-073309 A | 3/1995 |
| JP | 07-152912 A | 6/1995 |
| JP | 10-164370 A | 6/1998 |
| JP | 2000-069304 A | 3/2000 |

OTHER PUBLICATIONS

Hiroshi Murase et al., "Fast Visual Search Using Focused Color Matching –Active Search", Magazine of Institute of Electronic Information Communication (Sep. 25, 1998), vol. J81–D–II, No. 9, pp. 2035 through 2042.

Hiroshi Murase and V.V. Vinod, "Fast Visual Search Using Focussed Color Matching –Active Search–", collection of congress of electronic information and communication D-II vol. J81–DII, No. 9, pp. 2035–2042, Sep. 1998 (including partial translation).

* cited by examiner

Primary Examiner—Phuoc Tran
(74) Attorney, Agent, or Firm—Sidley Austin Brown & Wood LLP

(57) ABSTRACT

In an image retrieving apparatus for retrieving a retrieving image in an input image, a color histogram of an image in a retrieving area in the input image is compared with a color histogram of the retrieving image. At first, a candidate area in which the retrieving image can be included is roughly retrieved by rough image retrieving with selecting a larger retrieving area and a rough resolution of gradation of the histograms. Subsequently, an area including an image corresponding to the retrieving image is precisely retrieved by fine image retrieving with a smaller retrieving area and a fine resolution of gradation of the histograms.

44 Claims, 29 Drawing Sheets

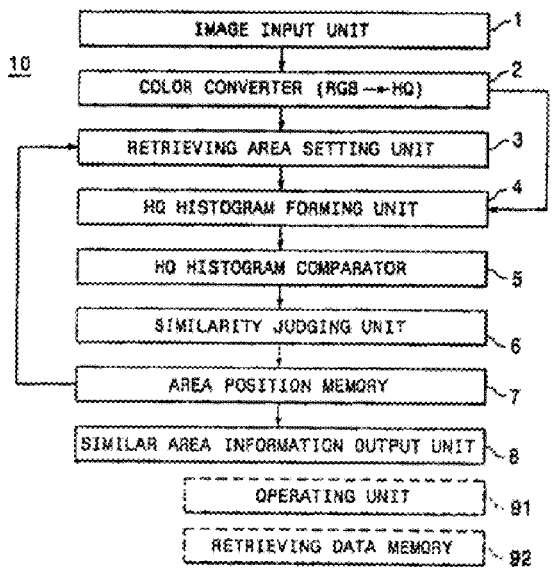

UNITED STATES PATENT AND TRADEMARK OFFICE
CERTIFICATE OF CORRECTION

PATENT NO. : 6,859,552 B2
APPLICATION NO. : 09/992164
DATED : February 22, 2005
INVENTOR(S) : Reiko Izume et al.

It is certified that error appears in the above-identified patent and that said Letters Patent is hereby corrected as shown below:

Drawing Sheet 1, FIG. 1, please delete FIG. 1 and add new FIG. 1 below.

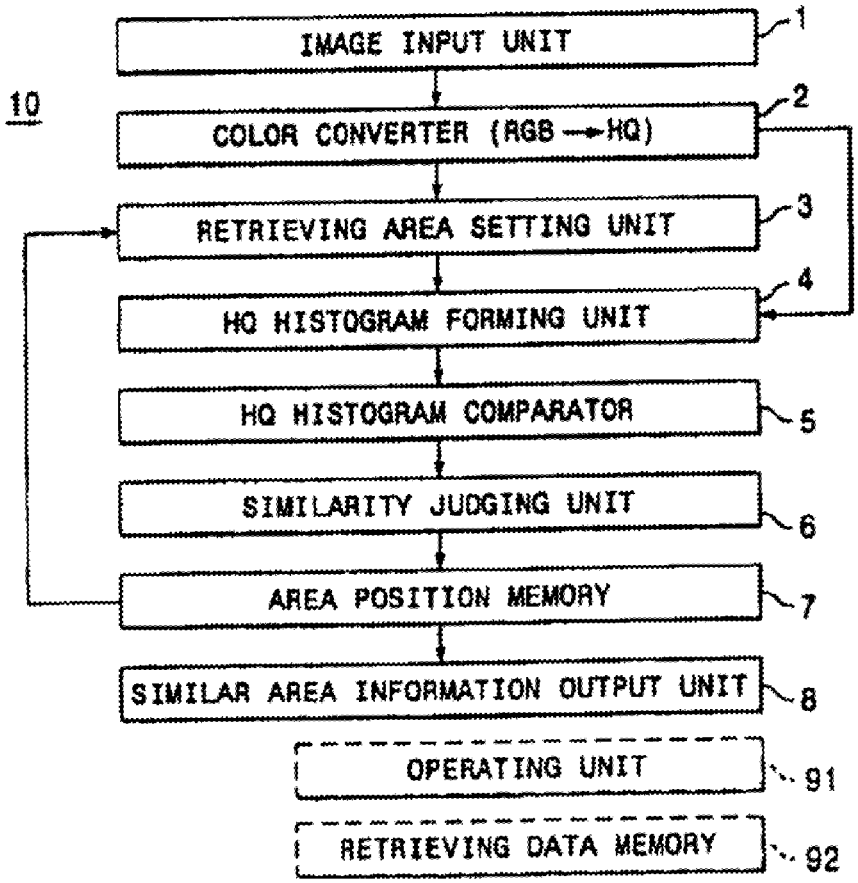

UNITED STATES PATENT AND TRADEMARK OFFICE
CERTIFICATE OF CORRECTION

PATENT NO. : 6,859,552 B2
APPLICATION NO. : 09/992164
DATED : February 22, 2005
INVENTOR(S) : Reiko Izume et al.

It is certified that error appears in the above-identified patent and that said Letters Patent is hereby corrected as shown below:

Drawing Sheet 9, FIG. 11, please delete FIG. 11 and add new FIG. 11 below.

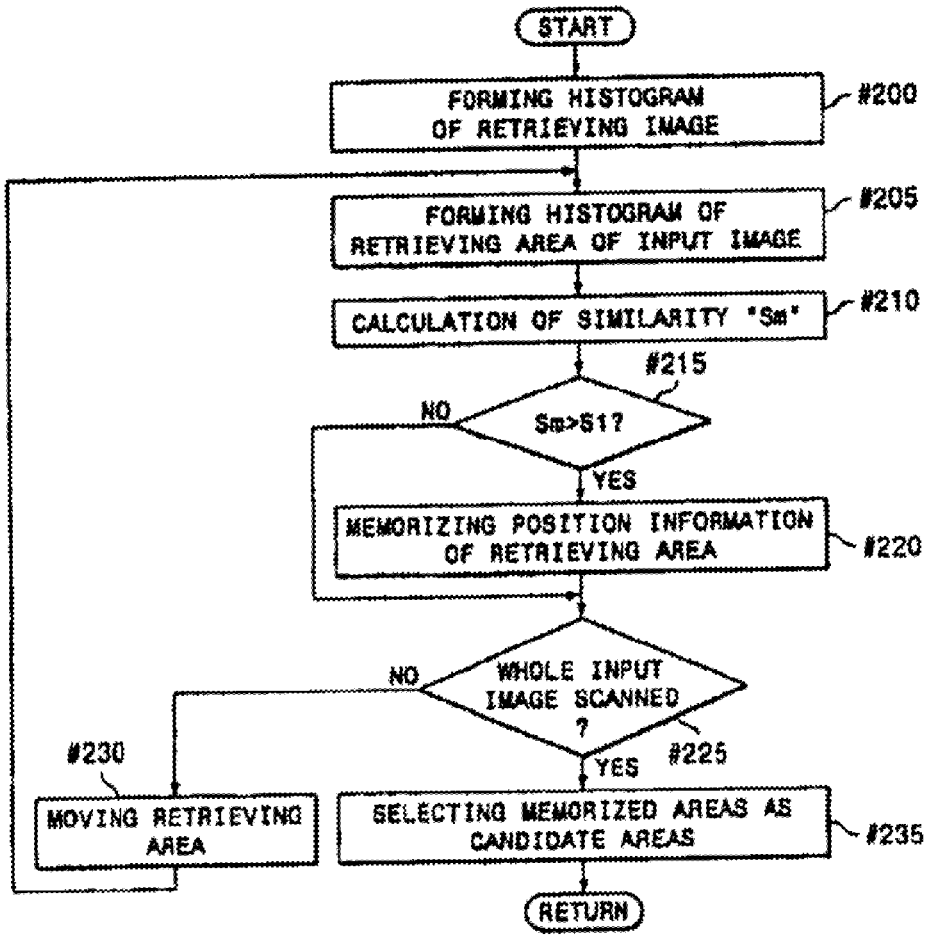

UNITED STATES PATENT AND TRADEMARK OFFICE
CERTIFICATE OF CORRECTION

PATENT NO.        : 6,859,552 B2
APPLICATION NO.   : 09/992164
DATED             : February 22, 2005
INVENTOR(S)       : Reiko Izume et al.

It is certified that error appears in the above-identified patent and that said Letters Patent is hereby corrected as shown below:

Drawing Sheet 11, FIG. 13, please delete FIG. 13 and add new FIG. 13 below.

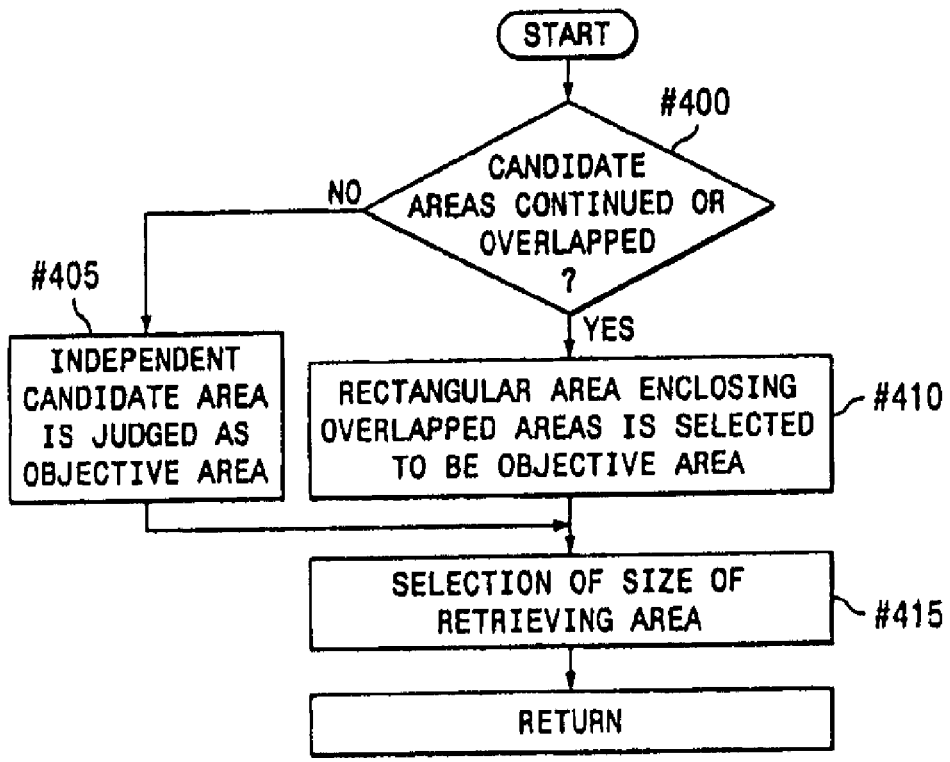

UNITED STATES PATENT AND TRADEMARK OFFICE
CERTIFICATE OF CORRECTION

PATENT NO. : 6,859,552 B2
APPLICATION NO. : 09/992164
DATED : February 22, 2005
INVENTOR(S) : Reiko Izume et al.

It is certified that error appears in the above-identified patent and that said Letters Patent is hereby corrected as shown below:

Drawing Sheet 19, FIG. 21, please delete FIG. 21 and add new FIG. 21 below.

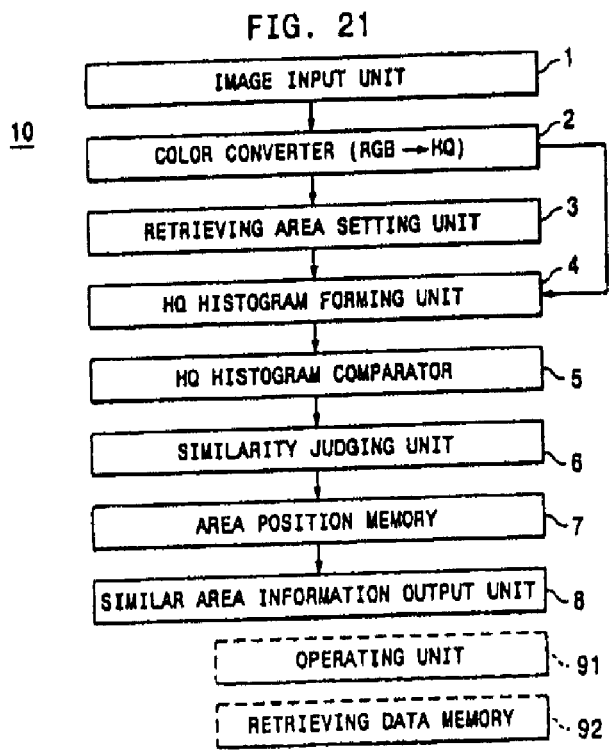

UNITED STATES PATENT AND TRADEMARK OFFICE
CERTIFICATE OF CORRECTION

PATENT NO. : 6,859,552 B2
APPLICATION NO. : 09/992164
DATED : February 22, 2005
INVENTOR(S) : Reiko Izume et al.

It is certified that error appears in the above-identified patent and that said Letters Patent is hereby corrected as shown below:

Drawing Sheet 22, FIG. 24, please delete FIG. 24 and add new FIG. 24 below.

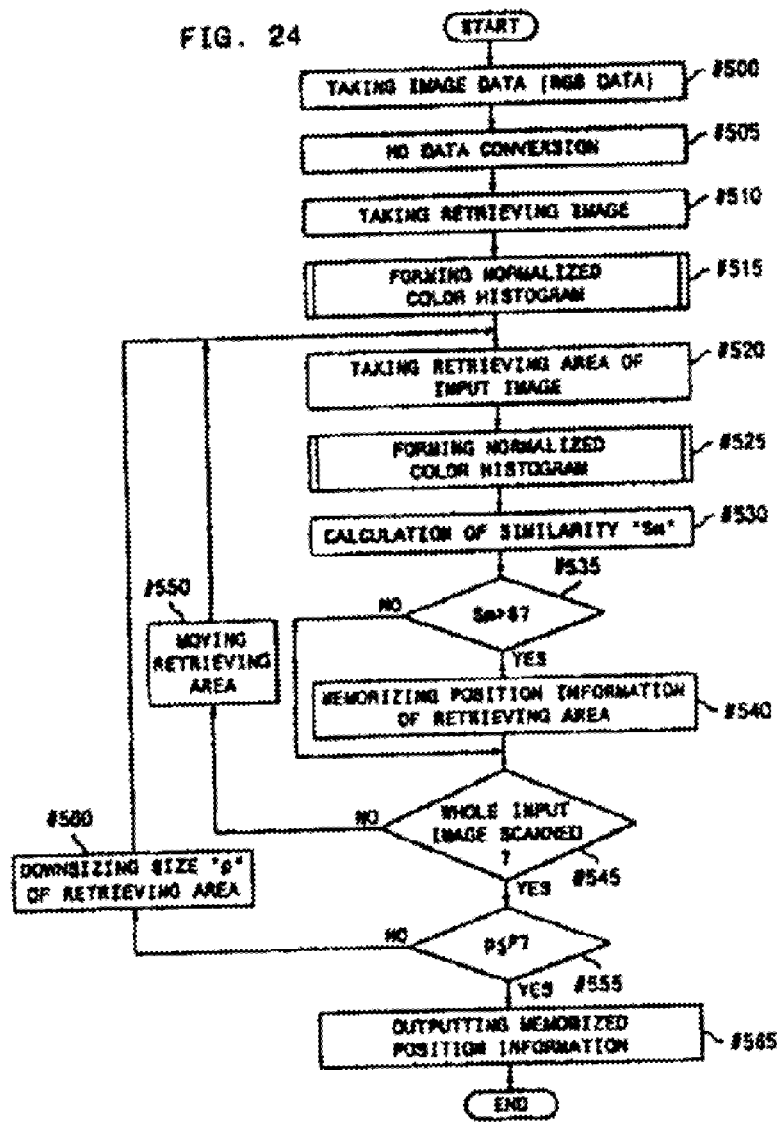

UNITED STATES PATENT AND TRADEMARK OFFICE
CERTIFICATE OF CORRECTION

PATENT NO. : 6,859,552 B2
APPLICATION NO. : 09/992164
DATED : February 22, 2005
INVENTOR(S) : Reiko Izume et al.

It is certified that error appears in the above-identified patent and that said Letters Patent is hereby corrected as shown below:

Drawing Sheet 24, FIG. 26, please delete FIG. 26 and add new FIG. 26 below.